(12) United States Patent
Yamada et al.

(10) Patent No.: US 11,697,896 B2
(45) Date of Patent: Jul. 11, 2023

(54) METHOD FOR PRODUCING A BIODEGRADABLE NONWOVEN FABRIC

(71) Applicant: Asahi Kasei Kabushiki Kaisha, Tokyo (JP)

(72) Inventors: Yusuke Yamada, Tokyo (JP); Chie Okamura, Tokyo (JP); Takuya Matsumoto, Tokyo (JP); Rumina Obi, Tokyo (JP); Kazufumi Kato, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 1093 days.

(21) Appl. No.: 16/339,519

(22) PCT Filed: Oct. 12, 2017

(86) PCT No.: PCT/JP2017/037058
§ 371 (c)(1),
(2) Date: Apr. 4, 2019

(87) PCT Pub. No.: WO2018/070490
PCT Pub. Date: Apr. 19, 2018

(65) Prior Publication Data
US 2020/0040495 A1 Feb. 6, 2020

(30) Foreign Application Priority Data
Oct. 14, 2016 (JP) .................. 2016-202742

(51) Int. Cl.
*B29C 51/02* (2006.01)
*D01D 1/04* (2006.01)
(Continued)

(52) U.S. Cl.
CPC .............. *D04H 1/435* (2013.01); *A47J 31/02* (2013.01); *A47J 31/06* (2013.01); *B29C 51/004* (2013.01);
(Continued)

(58) Field of Classification Search
CPC ........ B29C 51/004; B29C 51/02; D01D 1/04; D01D 5/088; D04H 3/16; D06C 3/00;
(Continued)

(56) References Cited

U.S. PATENT DOCUMENTS 5,229,191 A * 7/1993 Austin .................. D04H 1/559
156/290
5,437,918 A * 8/1995 Taniguchi .............. D04H 1/435
264/103 X
(Continued)

FOREIGN PATENT DOCUMENTS

EP 0765959 A1 * 4/1997 ............... D04H 3/16
EP 1057915 A1 12/2000
(Continued)

OTHER PUBLICATIONS

Supplementary European Search Report issued in corresponding European Patent Application No. 17859502.1 dated Sep. 30, 2019.
(Continued)

*Primary Examiner* — Leo B Tentoni
(74) *Attorney, Agent, or Firm* — Morgan, Lewis & Bockius LLP

(57) ABSTRACT

The present disclosure provides: a biodegradable nonwoven fabric for thermoforming, the biodegradable nonwoven fabric being composed of a fiber of a polylactic acid-based polymer, and having a basis weight of 20-300 g/m², preferably, a biodegradable nonwoven fabric characterized by being composed of a long fiber of a polylactic acid polymer, having an MD-direction elongation of 50% or more at 120°
(Continued)

C., and having an MD-direction dimensional change rate of ±4% or less at 80-140° C. as determined by thermomechanical analysis; a method for producing a molded body by using said biodegradable nonwoven fabric; and a method for molding a biodegradable beverage extraction container, the method being characterized in that the molded body has an MD-direction elongation change rate of 4% or less, as determined by thermomechanical analysis (TMA) under a load of 0.05 N/2 mm at 30-100° C.

5 Claims, 2 Drawing Sheets

(51) Int. Cl.
| | |
|---|---|
| D01D 5/088 | (2006.01) |
| D04H 3/16 | (2006.01) |
| D06C 3/00 | (2006.01) |
| D06C 3/02 | (2006.01) |
| D06C 3/04 | (2006.01) |
| D06C 3/08 | (2006.01) |
| D06C 3/10 | (2006.01) |
| D06C 15/00 | (2006.01) |
| D06C 15/02 | (2006.01) |
| D04H 1/435 | (2012.01) |
| A47J 31/02 | (2006.01) |
| B29C 51/00 | (2006.01) |
| B65D 65/46 | (2006.01) |
| D04H 1/558 | (2012.01) |
| D04H 3/011 | (2012.01) |
| A47J 31/06 | (2006.01) |
| B65D 85/804 | (2006.01) |
| B29K 67/00 | (2006.01) |
| B29K 105/00 | (2006.01) |
| B29L 31/00 | (2006.01) |

(52) U.S. Cl.
CPC ....... *B65D 65/466* (2013.01); *B65D 85/8061* (2020.05); *D04H 1/558* (2013.01); *D04H 3/011* (2013.01); *B29K 2067/046* (2013.01); *B29K 2105/256* (2013.01); *B29K 2995/006* (2013.01); *B29K 2995/0081* (2013.01); *B29L 2031/712* (2013.01); *D10B 2401/12* (2013.01)

(58) Field of Classification Search
CPC ... D06C 3/02; D06C 3/04; D06C 3/08; D06C 3/10; D06C 15/00; D06C 15/02
USPC .......... 264/103, 210.2, 210.5, 211.14, 211.2, 264/320, 322
See application file for complete search history.

(56) References Cited

U.S. PATENT DOCUMENTS

| 2003/0148688 A1 | 8/2003 | Matsunaga et al. |
| 2010/0304066 A1 | 12/2010 | Matsunaga |
| 2018/0028014 A1 | 2/2018 | Yamaguchi et al. |

FOREIGN PATENT DOCUMENTS

| EP | 2778271 A1 | 9/2014 |
| JP | H05-311537 A | 11/1993 |
| JP | H06-248511 A | 9/1994 |
| JP | H09-095848 A | 4/1997 |
| JP | 2000-136478 A | 5/2000 |
| JP | 2000-136479 A | 5/2000 |
| JP | 2002-177148 A | 6/2002 |
| JP | 2004-263344 A | 9/2004 |
| JP | 2011-157660 A | 8/2011 |
| JP | 2011-162904 A | 8/2011 |
| JP | 2015-074842 A | 4/2015 |
| WO | 2014/138898 A1 | 9/2014 |
| WO | 2016/147978 A1 | 9/2016 |

OTHER PUBLICATIONS

International Search Report issued in corresponding International Patent Application No. PCT/JP2017/037058 dated Jan. 9, 2018.
International Preliminary Report on Patentability and Written Opinion issued in corresponding International Patent Application No. PCT/JP2017/037058 dated Apr. 16, 2019.

* cited by examiner

METHOD FOR PRODUCING A BIODEGRADABLE NONWOVEN FABRIC

FIELD

The present invention relates to a biodegradable nonwoven fabric and molded body having high elongation, high heat stability and superior molding properties.

BACKGROUND

Molded bodies composed of biodegradable nonwoven fabric are known in the prior art and are used in a wide range of applications in various fields. Although molded bodies can be obtained by thermoforming nonwoven fabric, it is difficult to obtain molded bodies by thermoforming that are free of breakage, have little stretching unevenness and have an attractive shape that matches the shape of the molding die.

PTL1 indicated below discloses a method for obtaining a biodegradable long-fiber nonwoven fabric composed of a polylactic acid-based polymer and an aliphatic polyester copolymer, wherein the biodegradable nonwoven fabric composes a sea-island type composite long fiber in which the polylactic acid-based polymer forms the sea portions and the aliphatic polyester copolymer forms the island portions, and although a nonwoven fabric having improved thermal adhesive properties and formability is obtained as a result of having the aliphatic polyester copolymer that forms the island portions exposed on the fiber surface, this is inadequate for obtaining a molded body that is free of breakage, has little stretching unevenness and has an attractive shape that matches the shape of the molding die in a short period of time by thermoforming.

In addition, although PTL2 and PTL3 indicated below disclose a method for obtaining a biodegradable nonwoven fabric composed of polylactic acid or polybutylene succinate for forming, since the corresponding component fibers are formed by being partially thermocompression bonded, bonding between the corresponding fibers is excessively strong, thereby making it difficult to obtain a molded body having a deep molded depth without breaking during thermoforming.

CITATION LIST

Patent Literature

[PTL 1] Japanese Patent No. 5486331
[PTL 2] Japanese Patent No. 3432340
[PTL 3] Japanese Unexamined Patent Publication No. 2000-136479

SUMMARY

Technical Problem

With the foregoing in view, an object of the present invention is to provide a nonwoven fabric that is biodegradable and has high elongation, high heat stability and superior formability.

Solution to Problem

As a result of conducting extensive studies and experimentation to solve the aforementioned problems, the inventors of the present invention focused on the properties of nonwoven fabric prior to forming and found that, by making a nonwoven fabric comprise polylactic acid-based polymer fibers, making its elongation in the MD direction at 120° C. to be 50% or more and making its dimensional change rate in the MD direction at 80° C. to 140° C. as determined by thermomechanical analysis to be ±4% or less, a molded body can be obtained by thermoforming in a shorter period of time that is free of breakage, has little stretching unevenness and has an attractive shape, and the nonwoven fabric demonstrates favorable handling during thermoforming and can match complex formed shapes, thereby allowing the obtaining of a molded body superior in design. Moreover, the inventors of the present invention also found that, by making elongation change rate in the MD direction to be 4% or less when applying a load of 0.05 N/2 mm at 30° C. to 100° C. as determined by thermomechanical analysis (TMA) to a molded body piece that composes a container, heat stability of the molded body is no longer affected by expansion of the contents during extraction, and rupturing of the container caused by contact with or rubbing against joists on the inside of the extractor can be suppressed, thereby leading to completion of the present invention.

Namely, the present invention is as indicated below.

[1] A biodegradable nonwoven fabric for thermoforming comprising fibers of a polylactic acid-based polymer, wherein the basis weight of the biodegradable nonwoven fabric is 20 to 350 g/m$^2$.

[2] The biodegradable nonwoven fabric described in [1] above, wherein elongation in the MD direction at 120° C. is 50% or more, and dimensional change rate in the MD direction at 80° C. to 140° C. as measured by thermomechanical analysis is ±4% or less.

[3] The biodegradable long-fiber nonwoven fabric described in [1] or [2] above, wherein, in a temperature dependency test for evaluating dynamic viscoelasticity, the storage modulus of the nonwoven fabric in a temperature range of 90° C. to 150° C. is 10 MPa to 500 MPa.

[4] The biodegradable nonwoven fabric described in any of [1] to [3] above, wherein the value obtained by dividing the longitudinal tear strength of the nonwoven fabric by the basis weight is 0.002 N/(g/m$^2$) to 0.5 N/(g/m$^2$).

[5] The biodegradable nonwoven fabric described in any of [1] to [4] above, wherein the birefringence of the fibers in the nonwoven fabric is 0.002 to 0.10.

[6] The biodegradable nonwoven fabric described in any of [1] to [5] above, wherein the fibers in the nonwoven fabric further comprise, in addition to the polylactic acid-based polymer, 0.5 wt % to 30 wt % of an aliphatic ester copolymer relative to the total resin weight.

[7] The biodegradable long-fiber nonwoven fabric described in any of [1] to [6] above, wherein the average fiber diameter of the nonwoven fabric is 1 μm to 40 μm and the nonwoven fabric comprises long fibers.

[8] The biodegradable nonwoven fabric described in any of [1] to [7] above, wherein the nonwoven fabric has a maximum loss tangent (tan δ) of 0.5 or less in a temperature dependency test for evaluating dynamic viscoelasticity.

[9] The biodegradable nonwoven fabric described in any of [1] to [8] above, wherein, in a temperature dependency test for evaluating dynamic viscoelasticity, the storage modulus of the nonwoven fabric is 200 MPa or more at 10° C. to 70° C.

[10] The biodegradable nonwoven fabric described in any of [1] to [9] above, wherein the R/Ave value of the basis weight of a 2.5 cm square of a stretched sheet of the nonwoven fabric which has been biaxially stretched in the MD/CD directions simultaneously at an area magnification of 6.25 times at a temperature of 120° C. is within 1.0.

[11] A method for the production of the biodegradable nonwoven fabric described in any of [1] to [10] above, comprising a step of performing constant-length heat setting in the range of 50° C. to 160° C.

[12] A method for the production of a molded body, comprising a step of integrally processing, by thermoforming, the biodegradable long-fiber nonwoven fabric described in any of [1] to [10] above.

[13] The method described in [12] above, comprising a step of preheating the nonwoven fabric to 55° C. to 160° C.

[14] A molded body comprising the biodegradable nonwoven fabric described in any of [1] to [10] above, wherein the molding index of the molded body is 1.1 or more.

[15] A molded body group comprising the biodegradable nonwoven fabric described in any of [1] to [10] above, wherein the molding index of the molded body group is 1.1-fold to 20-fold, and the R/Ave values of the basis weights of pieces of fabric taken from the same location on the bottom of 10 or more molded bodies molded in the same molding machine from a continuous nonwoven fabric are within 0.5.

[16] A biodegradable beverage extraction container, comprising the molded body described in [14] above, wherein, when a load of 0.05 N/2 mm is applied to a molded body piece constituting the container, the elongation change rate in the MD direction at 30° C. to 100° C. as measured by thermomechanical analysis (TMA) is 4% or less.

[17] The beverage extraction container described in [16] above, wherein a change in capacity of the container during immersion in boiling water is 20% to 90%.

[18] The beverage extraction container described in [16] or [17] above, wherein the degree of orientation of a nonwoven fabric molded body constituting the beverage extraction container is 0.010 or more.

[19] The beverage extraction container described in any of [16] to [18] above, wherein the degree of crystallinity of a nonwoven fabric molded body constituting the beverage extraction container is 30% to 70%.

Advantageous Effects of Invention

The biodegradable nonwoven fabric of the present invention allows the obtaining of a molded body that is free of breakage, has little elongation unevenness and has an attractive shape in a short period of time during thermoforming. Further, the nonwoven fabric has favorable handling during thermoforming and can match complex shapes during thermoforming, thereby allowing the obtaining of a molded body superior in design, such as a food container.

DESCRIPTION OF EMBODIMENTS

Figure 1:
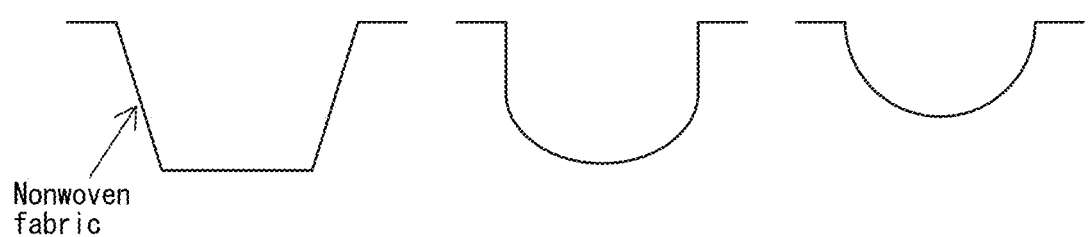
FIG. 1 is a schematic diagram of a typical example of the configuration of a beverage extraction container of another embodiment of the present invention.

The following provides a detailed explanation of an embodiment of the invention of the present application.

The biodegradable nonwoven fabric of the present embodiment can be made to have suitable elongation and dimensional change rate in a heat environment and demonstrate high formability.

The biodegradable nonwoven fabric of the present embodiment has formability. During conventional production of biodegradable nonwoven fabric having formability, attention was focused on the properties of the yarn immediately after spinning so as to demonstrate elongation and improve problems relating to processing such as thermocompression bonding of the nonwoven fabric. In contrast, in the biodegradable nonwoven fabric of the present embodiment, as a result of focusing on the properties of the nonwoven fabric used in molding per se as well as the properties of the molded body per se, a nonwoven fabric having high formability and an extraction container (molded body) having superior heat stability are obtained.

[Polylactic Acid-Based Polymer]

Examples of the polylactic acid-based polymer that composes the fibers of the biodegradable nonwoven fabric of the present embodiment (to be also referred to as "PLA") include copolymers selected from the group consisting of polymers of D-lactic acid, polymers of L-lactic acid, copolymers of D-lactic acid and L-lactic acid, copolymers of D-lactic acid and hydroxycarboxylic acid, copolymers of L-lactic acid and hydroxycarboxylic acid, and copolymers of D-lactic acid, L-lactic acid and hydroxycarboxylic acid, and blends of two or more types of these copolymers. Although the D/L ratio of the polylactic acid polymer can be set within a range that does not impair spinnability or nonwoven fabric properties, the ratio of the D form in the entire polylactic acid polymer is preferably 0% to 15%, more preferably 0.1% to 10% and even more preferably 0.1% to 6%. If the ratio of the D form is within these ranges, a nonwoven fabric having favorable spinnability can be stably obtained and properties such as melting point or crystallinity are within their appropriate range, thereby facilitating the obtaining of a nonwoven fabric having desired properties.

The melt flow rate (MFR) of the polylactic acid-based polymer of the present embodiment is preferably 20 g/10 min to 120 g/10 min and more preferably 30 g/10 min to 70 g/10 min. If MFR is 20 g/10 min or higher, melt viscosity becomes favorable and spinnability becomes favorable due to facilitating the occurrence of reductions in fiber diameter during the spinning process. On the other hand, if MFR is 120 g/10 min or lower, there is little occurrence of yarn breakage during the spinning process due to the suitable melt viscosity, thereby resulting in favorable spinnability.

[Aliphatic Polyester Copolymer]

Examples of the aliphatic polyester copolymer include poly(α-hydroxy acid) or copolymers having these as the main repeating unit elements thereof, poly(ω-hydroxyalkanoates) in the manner of poly(ε-caprolactone) or poly(β-propiolactone), poly(β-polyhydroxyalkanoates) in the manner of poly-3-hydroxypropionate, poly-3-hydroxyheptanoate or poly-3-hydroxyoctanoate, and copolymers having repeating unit elements composed thereof and repeating unit elements composed of poly-3-hydroxyvalerate or poly-4-hydroxybutyrate. In addition, other examples include polyalkylene dicarboxylates composed of a polycondensate of glycol and dicarboxylic acid such as polyethylene oxalate, polyethylene succinate, polyethylene adipate, polyethylene azelate, polybutylene oxalate, polybutylene succinate, polybutylene adipate, polybutylene sebacate, polyhexamethylene sebacate, polyneopentyl oxalate and polyalkylene dicarboxylate copolymers having repeating unit elements composed thereof.

Moreover, other examples include those obtained by selecting and blending multiple types of these individual polymers having biodegradability. The aliphatic polyester copolymer is preferably polybutylene succinate (to be also referred to as PBS) from the viewpoints of compatibility with polylactic acid and spinnability.

The MFR of the aliphatic ester copolymer is preferably 100 g/10 min or less at which stretchability of the spinning process is favorable, more preferably 20 g/10 min to 80 g/10 min, and even more preferably 30 g/10 min to 70 g/10 min. In addition, the melt flow rate ratio between the polylactic acid-based polymer and the aliphatic polyester copolymer is required to be within the range of 0.2 to 1.5. Namely, the melt flow rate ratio is such that 0.2≤[melt flow rate of aliphatic polyester copolymer/melt flow rate of polylactic acid-based polymer]≤1.5 and preferably 0.3 to 1.4. If the melt flow rate ratio is within these ranges, spinnability is favorable and dispersibility of the aliphatic polyester copolymer is favorable, thereby allowing the obtaining of stable thermal adhesion.

The aforementioned fibers can further contain 0.5 wt % to 30 wt % of an aliphatic ester copolymer in addition to the aforementioned lactic acid-based polymer based on total resin weight. The added amount of the aliphatic polyester copolymer is 0.5 wt % to 30 wt %, preferably 3 wt % to 27 wt % and even more preferably 5 wt % to 25 wt % when the total weight of resin is defined as 100 wt %. If the added amount is 0.5 wt % or more, crystallinity of the nonwoven fabric is easily adjusted resulting in favorable thermal properties. On the other hand, if the added amount is 30 wt % or less, the rate of crystallization increases and there is no thermal adhesion between fibers or between the fibers and the equipment during spinning, thereby enabling stable production.

Although there are no particular limitations on the method for the production of the nonwoven fabric of the present invention, the nonwoven fabric is obtained by a known spunbonding method, melt blowing method, air laying method, carding method or papermaking method and the like. Examples of methods that can be used to adhere the nonwoven fabric include embossing, thermal bonding, columnar flow confounding, mechanical confounding and needle punching. A long-fiber nonwoven fabric is more preferably produced by spunbonding since the nonwoven fabric can be produced efficiently and fluffing following molding can be suppressed.

In the case of using spunbonding, the resin is melted by heating and discharged from a spinneret followed by cooling the resulting spun yarn using a known cooling device and drawing the spun yarn to reduce the diameter thereof with an air sucker or other drawing device. Continuing, after having opened up the group of yarn discharged from the drawing device, the opened yarn is accumulated on a conveyor to form a web. Next, a long-fiber, spunbonded nonwoven fabric is obtained by partially carrying out thermocompression bonding on the web formed on the conveyor using a heated embossing roller or other partial thermocompression bonding device.

In the case of using spunbonding, although there no particular limitations thereon, the use of a method consisting of electrifying the fibers with corona equipment like that disclosed in, for example, Japanese Unexamined Patent Publication No. 11-131355 or a method consisting of opening up the fibers by, for example, adjusting the speed distribution of the air flow of the spraying portion of an ejector using a device that controls air flow in the manner of a dispersion plate in the shape of a flat plate followed by spraying a web and layering the web on a collecting surface while controlling scattering of the web, is preferable for improving web uniformity.

A nonwoven fabric obtained by spunbonding has strong fabric strength and is characterized in terms of physical properties such as eliminating the loss of short fibers caused by destruction of bonded portions, and is used in a wide range of applications such as hygiene, civil engineering, construction, agriculture/horticulture or domestic living materials due to the low cost and high productivity thereof.

The biodegradable nonwoven fabric of the present embodiment is characterized by the dimensional change rate in the MD direction at 80° C. to 140° C. as determined by thermomechanical analysis being ±4% or less.

The dimensional change rate in the MD direction at 80° C. to 140° C. as determined by thermomechanical analysis of the biodegradable nonwoven fabric of the present embodiment is ±4% or less and preferably ±2% or less. In the case the dimensional change rate is not excessively high, the biodegradable nonwoven fabric has suitable flexibility in the vicinity of the forming temperature, is able to match the shape even when forming into complex shapes, and is difficult to break, and then the resulting molded body has few irregularities in its surface and little elongation unevenness in which the nonwoven fabric is only partially elongated. For this reason, a molded body can be obtained that has an attractive shape with a superior design. On the other hand, in the case the dimensional change rate is below −4%, or in other words, in the case contraction is excessively large, the fabric becomes unstable due to heat resulting from preheating during forming and radiant heat of the mold, thereby causing the resulting molded body to have a poor shape and preventing the obtaining of a molded body having a large capacity. On the other hand, in the case the dimensional change rate exceeds 4%, or in other words, in the case elongation is excessively large, the fabric becomes unstable due to heat resulting from preheating during forming and radiant heat from the mold, thereby resulting in a poor shape of the resulting molded body.

Specific examples of methods for making dimensional change rate to be within the aforementioned ranges include adjusting the type of resin of the biodegradable nonwoven fabric, resin mixing ratio, resin temperature during spinning, discharge volume and rate, ambient temperature, spinning conditions of cooling and the like, roller temperature, pressure and speed during temporary compression bonding and thermocompression bonding, conditions such as aging or storage conditions. More specifically, a fabric having little dimensional change can be obtained by, for example, increasing spinning speed, lowering ambient temperature, raising cooling conditions, carrying out thermocompression bonding at a high temperature, or heat setting the nonwoven fabric that has undergone temporary compression bonding to a constant length at a temperature that is not excessively high.

The biodegradable nonwoven fabric of the present embodiment is characterized in that elongation in the MD direction at 120° C. is 50% or more.

The biodegradable nonwoven fabric of the present embodiment is required to be able to be elongated when heated during forming processing. Therefore, it is necessary that, for example, the nonwoven fabric is composed of low-elongation yarn and that the fibers either stretch or a shift occurs in the component fibers of the nonwoven fabric when heated. Thus, elongation of the biodegradable nonwoven fabric of the present invention when heated is such that elongation at a temperature of 120° C. is 50% or more, preferably 50% to 500%, more preferably 100% to 400% and even more preferably 180% to 350%. If elongation is within these ranges, formability is favorable and deep-drawn forming of the forming depth becomes easier the greater the elongation.

Examples of specific methods for making elongation at 120° C. to be within the aforementioned ranges include adjusting the type of resin of the biodegradable nonwoven fabric, resin mixing ratio, resin temperature during spinning, discharge volume and rate, ambient temperature, spinning conditions of cooling and the like, roller temperature, pressure and speed during temporary compression bonding and thermocompression bonding, and conditions such as aging and storage conditions. More specifically, a nonwoven fabric having been given a suitable bonding point while having high elongation can be obtained by, for example, not making the spinning speed during spinning excessively high, carrying out thermocompression bonding at a temperature that is not excessively high, or carrying out thermocompression bonding after obtaining a nonwoven web in a state in which the ambient temperature during spinning is not excessively low.

The biodegradable nonwoven fabric of the present embodiment is such that the value obtained by dividing longitudinal tear strength by basis weight is preferably 0.002 N/(g/m$^2$) to 0.5 N/(g/m$^2$) and more preferably 0.005 N/(g/m$^2$) to 0.2 N/(g/m$^2$). Longitudinal tear strength closely correlates fiber strength and elongation and fiber adhesive strength. In the case longitudinal tear strength is excessively small, fiber strength may be low or adhesion between fibers may be excessively strong. On the other hand, in the case longitudinal tear strength is excessively large, fiber strength and elongation are large or adhesion between fibers is excessively weak. Fiber strength and adhesive strength between fibers having an effect on tear strength can be made to be within a suitable range according to spinning conditions such as spinning speed or resin temperature, processing temperature and processing speed during thermocompression bonding such as embossing or calendering, or aging conditions and the like.

In the case the value obtained by dividing longitudinal tear strength by basis weight is not excessively large, since the fibers that compose the biodegradable nonwoven fabric are suitably adhered and have suitable adhesiveness even after molding, the fibers are resistant to lifting and the formation of fluff even after molding. Moreover, in the case the value obtained by dividing longitudinal tear strength by basis weight is not excessively large, the fabric has suitable stiffness, has suitable tension even under process tension and the nonwoven fabric easily passes through the processing steps, thereby making this preferable. On the other hand, in the case the value obtained by dividing longitudinal tear strength by basis weight is not excessively low, fibers are suitably adhered, fiber strength is not excessively low, and the biodegradable nonwoven fabric has suitable elongation and strength and demonstrates handling ease.

In addition, horizontal tear strength is preferably set within a range in which fibers composing the biodegradable nonwoven fabric are suitably adhered and, together with longitudinal tear strength, is preferably set within a range that allows the fabric to have suitable stiffness and pass through the processing steps.

Birefringence of the biodegradable nonwoven fabric of the present embodiment (long fibers composing the biodegradable nonwoven fabric sampled from the nonwoven fabric, and in other words, not the birefringence immediately after spinning long fibers composing the nonwoven fabric) is preferably 0.002 to 0.10, more preferably 0.005 to 0.10 and even more preferably 0.010 to 0.025. In the case birefringence is not excessively high, a biodegradable nonwoven fabric having high elongation can be obtained. In the case birefringence is not excessively low, the fabric can be stable under a thermal environment. Birefringence of the biodegradable nonwoven fabric of the present embodiment (fibers composing the biodegradable nonwoven fabric sampled from the nonwoven fabric) is a characteristic of the biodegradable nonwoven fabric, and there are no particular limitations on birefringence immediately before thermocompression bonding or immediately after spinning the fibers composing the biodegradable nonwoven fabric provided it falls within a range not impairing spinnability, thermocompression bondability or the demonstration of elongation by the nonwoven fabric.

The degree of crystallinity of the biodegradable nonwoven fabric of the present embodiment (fibers composing the biodegradable nonwoven fabric sampled from the nonwoven fabric) is preferably 30% to 70%, more preferably 35% to 62% and even more preferably 38% to 57%. In the case degree of crystallinity is not excessively low, there is no distortion of the shape of the molded body as a result of contraction of the fabric when removed from the mold during molding processing, while on the other hand, in the case degree of crystallinity is not excessively high, the fabric can be processed without breaking during molding processing.

The basis weight of the nonwoven fabric of the present embodiment is 20 g/m$^2$ to 300 g/m$^2$ and preferably 20 g/m$^2$ to 250 g/m$^2$. Strength is adequate if the basis weight is 20 g/m$^2$ or more, while on the other hand, processing can be carried out without applying a large load to the molding processing equipment during molding processing if the basis weight is 300 g/m$^2$ or less.

The average fiber diameter of the biodegradable nonwoven fabric of the present embodiment (fibers composing the biodegradable nonwoven fabric sampled from the nonwoven fabric) is preferably 1 μm to 40 μm, more preferably 10 μm to 40 μm and even more preferably 15 μm to 35 μm. Liquid permeability and content retention can be suitably selected according to basis weight and average fiber diameter, and in the case average fiber diameter is not excessively small, contents can be retained by functioning as a container (favorable resistance to powder leakage), while in the case average fiber diameter is not excessively large, liquid permeation rate is not excessively slow.

Although there are no particular limitations thereon, the shape of the fibers that compose the biodegradable nonwoven fabric of the present embodiment may be a round shape, flat shape or C-shape, Y-shape, V-shape or other irregular shape in cross-section, and preferably has a round cross-section. Moreover, it may have a sea-island structure, core-sheath structure or split fiber structure.

The shape of the biodegradable nonwoven fabric of the present embodiment may consist of a single layer within a multilayer nonwoven fabric such as SS, SMS, SMMS or SMSM. Here, S refers to a spunbonded long-fiber nonwoven fabric, while M refers to a melt blown ultrafine nonwoven fabric. In addition, a short fiber nonwoven fabric layer may be layered with the biodegradable nonwoven fabric serving as the base material.

The biodegradable nonwoven fabric of the present embodiment is obtained by a known spunbonding method, melt blowing method, flash method, thermal bonding method, air laying method, columnar flow confounding method or mechanical confounding method and the like. A long fiber nonwoven fabric obtained by spunbonding is preferable from the viewpoint of strength of the nonwoven fabric.

The fibers that compose the biodegradable nonwoven fabric of the present embodiment at least contain a polylactic acid-based polymer and are preferably low-stretch composite fibers further containing an aliphatic polyester copolymer. Low-stretch composite fibers consisting of polylactic acid-based polymer fibers and an aliphatic polyester copolymer are such that the degree of crystal orientation of the spinning process is held to a low level, the degree of crystallinity is low and stretchability is favorable, thereby enabling high elongation and high stretching. Fibers obtained at a low spinning speed of 500 m/min to 3000 m/min are used preferably, fibers obtained at a spinning speed of 700 m/min to 2700 m/min are used more preferably and fibers obtained at a spinning speed of 900 m/min to 2500 m/min are used even more preferably. In general, yarn immediately after spinning exhibits high crystallinity and orientation in the case of a rapid spinning speed, and exhibits low crystallinity and orientation in the case of a slow spinning speed.

During production of fibers that compose the biodegradable nonwoven fabric of the present embodiment, one type of two or more types of other resins, copolymers other than an aliphatic polyester copolymer, flame retardants, inorganic fillers, softeners, plasticizers, pigments, antistatic agents and the like may be added to the fibers that compose the nonwoven fabric according to the purpose of use.

Although embossing may be carried out for thermocompression bonding when producing the biodegradable nonwoven fabric of the present embodiment, the nonwoven fabric is preferably integrated with the surface of the fibers of a nonwoven fabric web subjected to temporarily thermocompression bonding by point adhesion to facilitate increases in heat stretchability. Although there are no particular limitations thereon, examples of the method used for temporary thermocompression bonding preferably include a method using a pair of embossing rollers having an irregular surface pattern on the surface of at least one of the rollers and a method using a pair of flat rollers having flat surfaces, while methods used to join nonwoven fabric can also be used such as needle punching or spunlacing.

In the case of obtaining a nonwoven fabric integrated into a single unit by point adhesion, fiber bonding in the biodegradable nonwoven fabric is limited to mild thermal adhesion and consists mainly of point adhesion on the fiber surfaces by carrying out temporary thermocompression bonding and thermal adhesion in two stages, and even if an embossing pattern is imparted by temporary thermocompression bonding, heat shrinkage appears microscopically in the periphery of the embossing pattern as a result of the thermal adhesion of the second stage being inhibited in the planar direction, and together with the embossing pattern being removed or weakening, unevenness in basis weight throughout the entire biodegradable nonwoven fabric is reduced.

In the case of combining embossing processing and thermocompression bonding during temporary compression bonding, compression bonding by embossing processing is preferably not excessively strong so that stress does not concentrate excessively during heat stretching. Although there are no particular limitations thereon, the compression bonding area ratio during embossing processing is preferably that which results in weak adhesion at a high frequency. Compression bonding area ratio is preferably 3% to 50% and more preferably 5% to 40% relative to the entire nonwoven fabric area.

Although there are no particular limitations on the thermal adhesion of the second stage provided it employs a thermal adhesion method that does inhibit the nonwoven fabric in the planar direction, felt calendering or air-through processing, for example, is preferable.

In addition, in the case of having carried out embossing processing for the typical processing method used for thermal adhesion of the nonwoven fabric, since fibers of the fabric are tightly compression-bonded by thermocompression bonding, fiber shape is unable to be maintained at those portions subjected to compression bonding resulting in the fibers having a crushed shape, the fibers are mutually fused to exhibit the form of a film resulting in formation of an embossing pattern. In the case crystallization has progressed excessively and the nonwoven fabric containing the portion that has been formed into a film is attempted to be stretched in a hot environment, there are cases in which it is difficult to obtain high elongation. In addition, since a molded body using a nonwoven fabric produced by embossing processing includes the portion that has been formed into a film, liquid permeability becomes poor, which may result in problems in applications requiring liquid permeability.

In the case of temporarily adhering the biodegradable nonwoven fabric of the present embodiment, a temporarily thermocompression-bonded biodegradable nonwoven fabric is obtained by subjecting to thermal adhesion using a pair of embossing rollers having an irregular surface pattern on the surface of at least one of the rollers at roller temperature of 25° C. to 100° C. and preferably 35° C. to 80° C. and at a linear pressure of 50 N/cm to 1000 N/cm and preferably 200 N/cm to 700 N/cm. Next, the temporarily thermocompression-bonded biodegradable fabric is then subjected to thermal adhesion using felt calendar rollers at a roller temperature of 50° C. to 160° C. and preferably 80° C. to 150° C. to fuse the fiber surfaces at the confounding points of the fibers, thereby making it possible for the fibers to adhere in punctate form and increase the frequency of locations where those adhered portions are present. Moreover, since this point adhesion exhibits weaker joining in comparison with ordinary thermal adhesion, stretching processing can be carried out uniformly with little stress, thereby making this suitable for thermoforming accompanying considerable stretching.

The method used to obtain the biodegradable nonwoven fabric of the present embodiment is preferably carried out by constant-length heat setting. By applying heat to a nonwoven fabric web immediately after spinning in a state of applying tension during thermocompression bonding, surface properties of the nonwoven fabric are favorable, a nonwoven fabric having heat stretchability is obtained, there is no breakage during molding processing, and a molded body having an attractive shape can be obtained, thereby making this preferable. An ordinary method may be used for the method used to carry out constant-length heat setting, and, for example, hot air drying, pin tenter drying, hot plate heating, calendering, felt calendering, air-through processing or hot pressing may be used. Although there are no particular limitations on the temperature range at which constant-length heat setting is carried out provided it includes a temperature at which the resin composing the nonwoven fabric does not adhere to the equipment and the nonwoven fabric can be obtained in a state in which fibers of the nonwoven fabric are suitably adhered, the temperature is preferably 50° C. to 160° C., more preferably 70° C. to 160° C. and even more preferably 80° C. to 150° C. In the case the temperature at which constant-length heat setting is carried out is not excessively high, it is unlikely that the device will be soiled by the nonwoven fabric, thereby allowing the obtaining of a nonwoven fabric having favorable handling and productivity. On the other hand, in the case the temperature not excessively low, a state can be obtained in which fibers of the nonwoven fabric are suitably adhered.

Heated elongation was conventionally obtained by lowering the degree of crystallinity and degree of orientation of fibers of thermoformable nonwoven fabric immediately after spinning. However, achieving a fiber state of low degree of crystallinity and degree of orientation immediately after spinning results in a state of residual instability to heat, and it was difficult to suitably achieve a state of thermocompression bonding when forming the nonwoven fabric. For example, in the case of having carried out thermocompression bonding by embossing, there are numerous crystallized portions in the embossed portion, while on the other hand, there are many non-crystallized portions in the non-embossed portion, boundaries between embossed portions and non-embossed portions and embossed portions are susceptible to destruction during thermoforming, and it was sometimes difficult to obtain a molded body having an attractive shape without breaking during thermoforming. In addition, adjustment of spinning conditions was also carried out as a method for setting degree of crystallinity and degree of orientation to low levels. If lowering spinning speed so as not to apply stretching to the fibers, although the resulting nonwoven fabric web has a low degree of crystallinity and degree of orientation, when thermocompression bonding is carried out at a low degree of crystallinity and degree of orientation, crystallization proceeds excessively and it was sometimes not possible to obtain a nonwoven fabric having superior moldability. Thus, in the present embodiment, thermocompression bonding, felt calendering, air-through processing or aging and the like are preferably carried out in order to further stabilize processing in a state in which nonwoven fabric is unstable.

As is described in PTL1-3 and Japanese Examined Patent Publication No. 1-047581, in methods conventionally used to obtain thermoformability, it was necessary to suppress oriented crystallization during spinning, and reducing spinning speed to obtain a structure having a large number of amorphous portions was carried out. However, nonwoven fabric having a large number of amorphous portions is in a state that is susceptible to the effects of heat and frequently lacked dimensional stability in hot environments. Here, when considering the resin properties of polylactic acid in comparison with polyester, since polylactic acid has a lower melting point, smaller difference between melting point and glass transition temperature, and slower crystallization time, sufficient time and heat are required for thermoforming. However, when embossing processing and the like is carried out to enhance heat stability of nonwoven fabric, it was difficult to produce a nonwoven fabric due to the occurrence of shrinking. For this reason, the biodegradable nonwoven fabric of the present invention having dimensional stability is preferably subjected to constant-length heat setting that allows heat to be applied in a tensile state.

Moreover, in order to evaluate thermal properties of a molded nonwoven fabric in the present embodiment, attention was focused on storage modulus in evaluating the temperature dependency of dynamic viscosity, as well as loss tangent, and optimization of these parameters led to the obtaining of favorable spreadability and heat resistance stability when used as a nonwoven fabric for molding.

Since it is important to control the mobility and orientation of the amorphous portion of the resin in order to obtain a nonwoven fabric having superior spreadability, techniques were conventionally employed in which the degree of crystallinity and degree of orientation of the fibers were lowered immediately after spinning. However, during actual molding, nonwoven fabric was used in temperature environments such as normal temperature transport or heating during preheating or heating due to thermoforming, and it was difficult to consistently evaluate fabric aptitude based on the values of these properties. Therefore, optimizing nonwoven fabric production conditions by evaluating aptitude in the molding step using storage modulus in evaluating the temperature dependency of dynamic viscosity, which is used to evaluate resin softness with respect to temperature change as well as loss tangent, led to the obtaining of a nonwoven fabric having superior spreadability and heat stability.

The storage modulus over a temperature range of 90° C. to 150° C. of the nonwoven fabric of the present embodiment in an evaluation of the temperature dependency of dynamic viscosity is usually 15 MPa to 500 MPa, preferably 20 MPa to 300 MPa, more preferably 20 MPa to 200 MPa and particularly preferably 25 MPa to 150 MPa. As a result of making the storage modulus at 90° C. to 150° C. to be within these ranges, the nonwoven fabric can follow deformation caused by the mold mostly without breaking during hot press molding, and the resulting molded body has few irregularities on its surface and has little elongation unevenness in which the nonwoven fabric is only partially elongated, thereby allowing the obtaining of a molded body that has an attractive shape with a superior design. On the other hand, in the case storage modulus is below these ranges, elongation unevenness occurs easily due to the shape of the mold and temperature unevenness during heating since the mechanical strength of the nonwoven fabric is excessively low due to the heat present during molding. On the other hand, in the case storage modulus exceeds these ranges, since mechanical strength still remains high even if heat is applied during molding, the fabric is easily broken when stretched in the mold.

The storage modulus of the nonwoven fabric of the present embodiment over a temperature range of 10° C. to 70° C. when evaluating temperature dependency of dynamic viscosity is usually 200 MPa, preferably 250 MPa or more and more preferably 300 MPa or more. As a result of making the storage modulus at 10° C. to 70° C. to be within these ranges, a nonwoven fabric can be favorably transported without causing breakage or deformation of the nonwoven fabric in the molding step.

The maximum value of loss tangent (tan δ) of the nonwoven fabric of the present embodiment in a temperature dependency test for evaluating dynamic viscosity is 0.5 or less, preferably 0.45 or less and more preferably 0.40 or less. The size of the maximum value of tan δ obtained in a temperature dependency test of dynamic viscosity indicates the degree of freedom of molecules, and a larger value indicates a wider range of molecule movement. Namely, when the value of tan δ becomes 1 or more at an arbitrary temperature, the degree of freedom of the molecules at that temperature becomes large, the fabric becomes thermally unstable and heat shrinkage and the like are induced.

The change rate of the storage modulus of the nonwoven fabric of the present embodiment relative to temperature in a temperature dependency test for evaluating dynamic viscosity is preferably 3 MPa to 50 MPa, more preferably 5 MPa to 35 MPa and even more preferably 10 MPa to 25 MPa. If the change rate of storage modulus relative to temperature is within the aforementioned ranges, tracking of the mold during thermoforming is suitable and molding can be carried out in the absence of molding unevenness and breakage. In the case the change rate of storage modulus relative to temperature is below the aforementioned ranges, mold trackability is poor due to the high stiffness of the sheet during molding and breakage occurs caused by cracking of the sheet. On the other hand, in the case the change rate of storage modulus relative to temperature exceeds the aforementioned ranges, tracking of deformation during molding becomes excessively good, thereby resulting in the occurrence of hole formation and breakage attributable to excessive elongation.

Furthermore, the change rate of storage modulus relative to temperature can be calculated according to the following equation by which the change in storage modulus when carrying out a temperature dependency test for evaluating dynamic viscosity is divided by a temperature change.

$$\text{Temperature dependency test of dynamic viscosity} = \Delta\text{elastic modulus}/\Delta\text{temperature}$$

In the molding step in particular, accuracy unevenness such as uneven heating in the direction of the equipment rows occurs easily since molding is carried out in numerous rows for the purpose of improving productivity. Consequently, as a result of making storage modulus when evaluating temperature dependency of dynamic viscosity of a nonwoven fabric, loss tangent, and change rate of storage modulus relative to temperature to be within the aforementioned ranges, breakage during molding and molding unevenness can be suppressed, thereby making it possible to carry out production that is stable in terms of quality.

Although there are no particular restrictions on the specific methods used to make storage modulus during evaluation of dynamic viscosity and loss tangent to be within the aforementioned ranges, the inventors of the present invention employed a method for thermocompression bonding of the fabric obtained by spinning and optimized the birefringence of the fibers in the nonwoven fabric obtained by thermocompression bonding, thereby leading to completion of the present invention. Specific examples of methods used to make storage modulus during evaluation of dynamic viscosity and loss tangent to be within the aforementioned ranges include adjusting the type of resin of the biodegradable nonwoven fabric, resin mixing ratio, resin temperature during spinning, discharge volume and rate, ambient temperature, spinning conditions of cooling and the like, roller temperature, pressure and speed during temporary compression bonding and thermocompression bonding, conditions such as aging or storage conditions. More specifically, a nonwoven fabric having high elongation while having suitable adhesion points imparted thereto can be obtained by, for example, not making the spinning speed during spinning excessively high, carrying out thermocompression bonding at a temperature that is not excessively high, or carrying out thermocompression bonding by obtaining a nonwoven fabric web in a state in which the ambient temperature during spinning is not excessively low.

When carrying out molding, nonwoven fabric is simultaneously stretched in both the direction of flow and direction of width of the nonwoven fabric by the mold. Therefore, the inventors of the present invention evaluated uniform moldability of the nonwoven fabric by evaluating basis weight unevenness by biaxially stretching simultaneously in both directions in addition to carrying out a conventionally used tensile test in the uniaxial direction, as an index for evaluating post-molding uniformity in thermoforming.

The biodegradable nonwoven fabric of the present embodiment is characterized in that the value of R/Ave is 1.0 or less with respect to the basis weight of a 2.5 cm square of a stretched sheet of the nonwoven fabric that has been biaxially stretched in the MD and CD directions simultaneously at an area magnification factor of 6.25 and temperature of 120° C. The value of R/Ave of the biodegradable nonwoven fabric of the present embodiment with respect to the basis weight of a 2.5 cm square of a stretched sheet of the nonwoven fabric that has been biaxially stretched in the MD and CD directions simultaneously at an area magnification factor of 6.25 and in an atmosphere of 120° C. is 1.0 or less and preferably 0.7 or less. In the case the value of R/Ave is not excessively high, stretching during molding of the nonwoven fabric becomes uniform and storageability of a stored powder as well as liquid permeability become uniform.

Specific examples of methods for making the value of R/Ave of an MD/CD biaxially stretched sheet to be within the aforementioned ranges include adjusting the type of resin of the biodegradable nonwoven fabric, resin mixing ratio, resin temperature during spinning, discharge volume and rate, ambient temperature, spinning conditions of cooling and the like, roller temperature, pressure and speed during temporary compression bonding and thermocompression bonding, conditions such as aging or storage conditions. More specifically, a nonwoven fabric such that the value of R/Ave of an MD/CD biaxially stretched sheet is small can be obtained by, for example, lowering the spinning speed, raising the ambient temperature, lowering cooling conditions, carrying out thermocompression bonding at a high temperature or carrying out constant-length heat setting with the nonwoven fabric web subjected to temperature compression bonding at a sufficiently high temperature.

The biodegradable nonwoven fabric of the present embodiment can be integrated by thermoforming to obtain a molded body. There are no particular limitations on the shape of the molded body and is preferably selected from among a semicircular shape, cylindrical shape, oval shape, triangular shape or rectangular shape and the like according to the purpose of use. In the case of desiring to obtain a molded body having a larger capacity relative to the area of the original nonwoven fabric used for molding, a molding mold is suitably selected so as to further increase the surface area of the nonwoven fabric before and after molding.

If the method used to mold the molded nonwoven fabric of the present embodiment includes a thermoforming step, there are no particular limitations thereon and the method may include a preheating step prior to thermoforming and a shape retention step for maintaining capacity after thermoforming.

As a result of including a preheating step prior to thermoforming, the temperature of the nonwoven fabric can be controlled immediately prior to molding and storage modulus and other characteristic values of the nonwoven fabric can be made to be values suitable for molding. The range of the temperature of the nonwoven fabric immediately prior to molding is preferably 55° C. to 160° C., more preferably 60° C. to 130° C. and particularly preferably 70° C. to 120° C. If the temperature of the nonwoven fabric immediately prior to molding is 50° C. or lower, breakage, molding unevenness and other molding defects occur easily due to the high storage modulus and poor tracking of the mold during molding, while if the temperature of the nonwoven fabric immediately prior to molding is 140° C. or higher, breakage and other molding defects occur since the storage modulus is excessively low and the nonwoven fabric is unable to withstand the stress applied thereto during molding.

In the case the nonwoven fabric used in the present embodiment is composed of polylactic acid, shrinkage of the molded body caused by residual stress during stretching of the sheet during molding occurs earlier than crystallization of the sheet since the crystallization rate thereof is extremely slow, thereby easily resulting in a molded body having a small capacity. Consequently, in order to rapidly cool and solidify the molded body and obtain the effect of shape retention, a shape retention step is included after molding, thereby making it possible to obtain a molded body having a large capacity.

A process enabling continuous and uniform molding can be obtained by carrying out thermoforming processing together with these preheating and shape retention steps, and by molding the nonwoven fabric of the present embodiment using these molding processes, a uniform molded body can be provided. For example, the R/AVE value of the basis weight of fabric sampled from the same location on the bottom of molded bodies of a commercially available product in which 10 or more molded bodies are enclosed can be made to be within 0.5, thereby making it possible to provide a product that does not exhibit leakage of contents and does not have any problems in terms of design when used in a food filter and the like.

The degree to which the biodegradable nonwoven fabric of the present embodiment is molded is represented with the molding index. Molding index refers to the value defined in the following equation (1) that is determined by dividing the surface area of the molded body by the area of the planar nonwoven fabric used for the molded body prior to molding (area of the opening in the case of being in the form of a container):

Molding index=(surface area of molded body cm$^2$)/ (area of nonwoven fabric prior to molding cm$^2$)

The molding index of a molded body composed of the biodegradable nonwoven fabric of the present embodiment is preferably 1.1 or more, more preferably 1.1 to 20, even more preferably 1.5 to 10 and most preferably 2.5 to 6. In the case the molding index is large, this indicates that elongation of the nonwoven fabric is large. On the other hand, in the case the molding index is small, this indicates that elongation of the nonwoven fabric is small. Since the biodegradable nonwoven fabric of the present embodiment has high elongation, it enables the production of molded articles having high elongation and large molding index. In the case the molding index is not excessively large, the nonwoven fabric can be molded without breaking, while in the case the molding index is not excessively small, the molded body is able to have a suitable size when contents are filled into a container.

In thermoforming, when considering from the viewpoint of the properties of polylactic acid in comparison with polyester resin, although polyester allows the obtaining of a molded body by raising the molding temperature during molding since polyester has a high melting point, a large difference between melting point and glass transition temperature and a rapid crystallization rate, polylactic acid has a low melting point, small difference between melting point and glass transition temperature and a slow crystallization rate, and therefore it is difficult for sufficient heat to be imparted to the nonwoven fabric for molding thereby preventing the molding temperature from becoming high. Accordingly, constant-length heat setting is preferably carried out on the biodegradable nonwoven fabric of the present embodiment in order to solidify the shape of the nonwoven fabric prior to molding.

Furthermore, typical resin properties of polylactic acid and polyester in that order are indicated as follows: melting point: 170° C., 260° C.; recrystallization temperature: 70° C., 120° C.; glass transition temperature: 55° to 60° C., 70° C. to 80° C.; specific heat: 1.38 J/g·K, 1.00 J/g·K to 1.15 J/g·K; thermal conductivity: 0.13 W/m·K, 0.2 W/m·K to 0.33 W/m·K; crystallization half-time: 500 seconds to 900 seconds, 50 seconds to 100 seconds.

The nonwoven fabric of the present embodiment can also become an embodiment further suitable for use as a beverage extraction container by adjusting molding conditions and controlling the properties of the molded body. The following provides a detailed explanation of this other embodiment.

Background

A conventionally known method for easily extracting an extracted substance such as black tea, green tea, ground coffee, medicines or herbal medicines and the like consisted of sealing the extracted substance in a beverage extraction container and extracting a beverage with an extractor by pouring hot water into the container, and an example thereof is the single serve method. Examples of beverage extraction containers include those provided with a piece of pleated paper on the inside of a resin container, those provided with a nonwoven fabric molded into the shape of a container on the inside of a resin container, and those using a molded body obtained by molding a nonwoven fabric into the shape of a container.

It is necessary to form a hole in the bottom of a beverage extraction container having a resin container in order to secure an outlet for the hot water. A needle is installed in the bottom of the location where the container is installed in the extractor.

A beverage extraction container used in the aforementioned extractor is disclosed in Japanese Unexamined Patent Publication No. 2015-85086. In the case of a beverage extraction container provided with such a molded body molded into the shape of a container on the inside of a resin container, it is necessary to provide a space at the bottom of the resin container so that the molded body is not punctured by a needle and the container becomes large, thereby resulting in problems in terms of handling due to the container becoming bulky for transport, display or storage.

In general, an extracted substance expands when hot water is poured thereon during extraction of the extracted substance. In the case of a beverage extraction container that uses a molded body molded into the shape of a container, the contents expand during extraction and the container swells, thereby resulting in the problems of contact with the needle provided in the extractor, breakage of the nonwoven fabric and leakage of the contents.

Technical Problem

Solution to Problem

With the foregoing in view, as a result of conducting extensive studies and experimentation on the present invention (other embodiment) in order to obtain a beverage extraction container having superior shape stability in hot environments and superior beverage extractability, the inventors of the present invention found that it was possible to obtain a beverage extraction container that is free of breakage, demonstrates retention of contents (such as exhibiting little leakage of powder), has an attractive appearance, and demonstrates favorable dimensional stability in hot environments, thereby leading to completion of the present invention.

Claims

More specifically, the object of the present invention is achieved by controlling the properties of the nonwoven fabric after molding in the manner indicated below:
(i) elongation change rate in the MD direction at 30° C. to 100° C. as measured by thermochemical analysis (TMA) when a load of 0.05 N/2 mm is applied to a molded body piece constituting the container is 4% or less;
(ii) change in capacity during immersion in boiling water is 20% to 90%;
(iii) degree of orientation of a nonwoven fabric molded body constituting the container is 0.010 or more; and,
(iv) degree of crystallinity of a nonwoven fabric molded body constituting the container is 30% to 70%.

Advantageous Effects of Invention

As a result of obtaining a beverage extraction container that satisfies the aforementioned properties by using a biodegradable nonwoven fabric, the beverage extraction container can be preferably used as a container when extracting black tea, green tea, ground coffee, medicines or herbal medicines and the like due to the superior shape stability and beverage extractability thereof in a hot environment.

BRIEF DESCRIPTION OF DRAWINGS

FIG. 1 is a schematic diagram of a typical example of the configuration of a beverage extraction container of another embodiment of the present invention.

Figure 2:
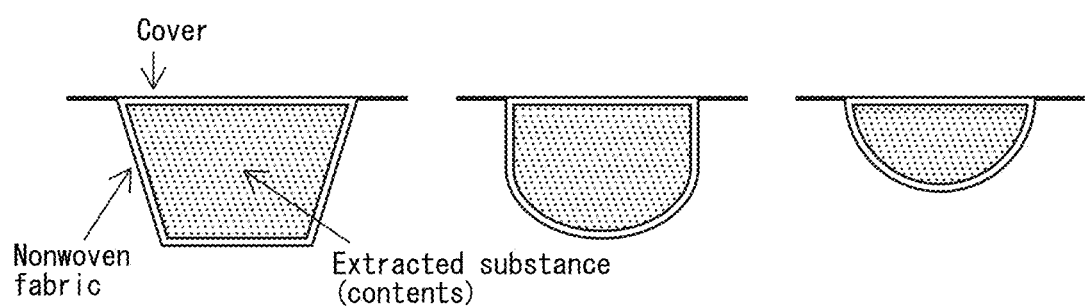
FIG. 2 is a schematic diagram for explaining a typical example of a covered beverage extraction container of another embodiment of the present invention.

FIG. 2 is a schematic diagram for explaining a typical example of a covered beverage extraction container of another embodiment of the present invention.

Figure 3:
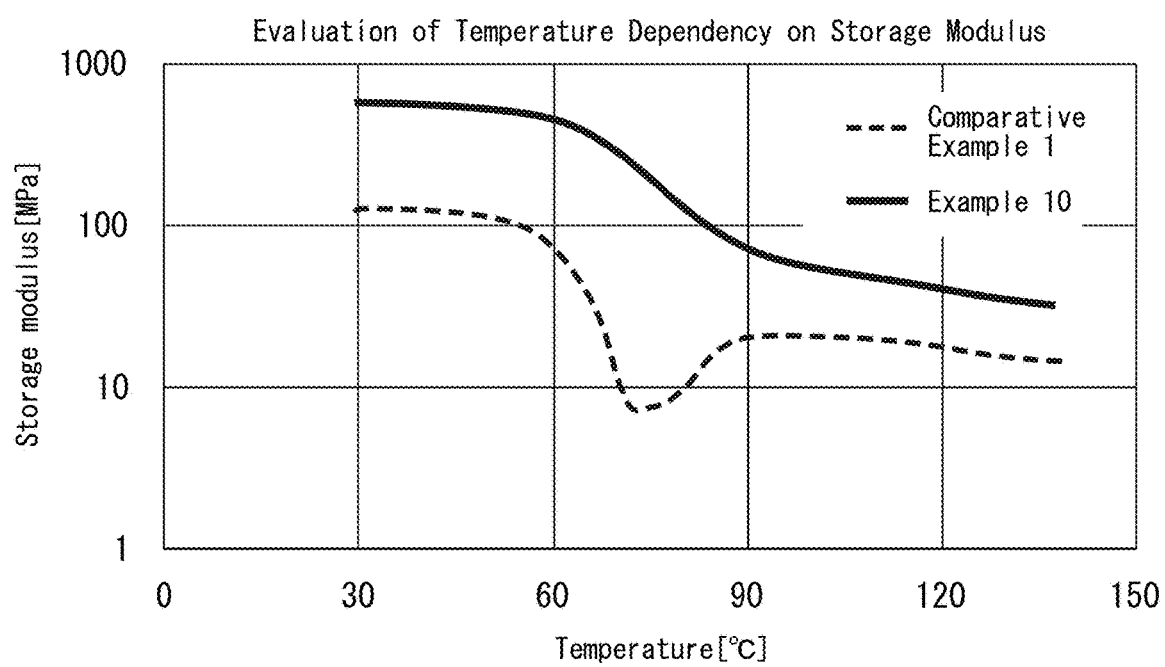
FIG. 3 is a graph indicating the results of evaluating temperature dependency of storage modulus in Example 10 and Comparative Example 1.

FIG. 3 is a graph indicating the results of evaluating temperature dependency of storage modulus in Example 10 and Comparative Example 1.

Figure 4:
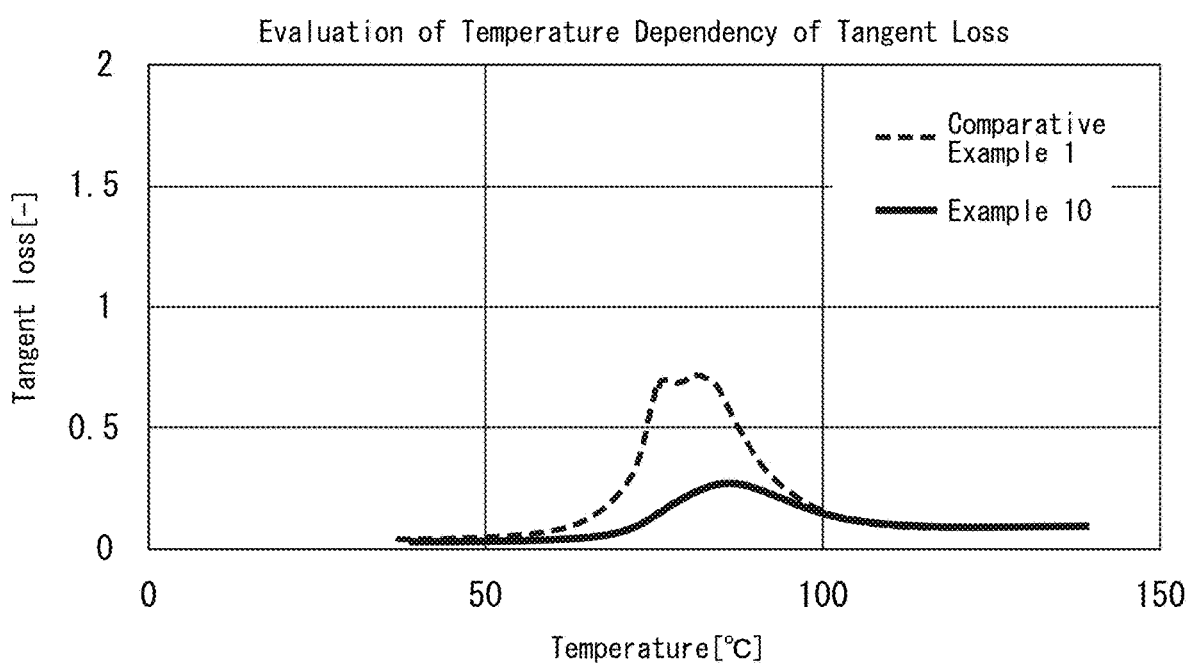
FIG. 4 is a graph indicating the results of evaluating temperature dependency of loss tangent in Example 10 and Comparative Example 1.

FIG. 4 is a graph indicating the results of evaluating temperature dependency of loss tangent in Example 10 and Comparative Example 1.

DESCRIPTION OF EMBODIMENTS

The following provides a detailed explanation of an embodiment (other embodiment) of the invention of the present application.

The beverage extraction container of the present embodiment is able to demonstrate shape stability and beverage extractability during beverage extraction as a result of employing a suitable configuration and molding conditions for the nonwoven fabric that composes the container.

Explanation of Terms

The beverage extraction container of the present embodiment refers to a nonwoven fabric molded body that has undergone molding processing. A cover may be provided for filling the container with a beverage and sealing the beverage inside.

[Container Materials]

Biodegradable resin, and particularly a polylactic acid-based polymer (also referred to as PLA), can be used for the material of the nonwoven fabric that composes the beverage extraction container of the present embodiment. Examples of polylactic acid-based polymers include polymers selected from the group consisting of polymers of D-lactic acid, polymers of L-lactic acid, copolymers of D-lactic acid and L-lactic acid, copolymers of D-lactic acid and hydroxycarboxylic acid, copolymers of L-lactic acid and hydroxycarboxylic acid, and copolymers of D-lactic acid, L-lactic acid and hydroxycarboxylic acid, or blends of two or more types of these polymers. Although the D/L ratio of the polylactic acid polymer can be set within a range that does not impair productivity or properties of the nonwoven fabric, the ratio of the D form based on the total weight of the polylactic acid is preferably 0% to 15%, more preferably 0.1% to 10% and even more preferably 0.1% to 6%. If the ratio of the D form is within these ranges, the crystallinity, melting point and so on of the nonwoven fabric that composes the beverage extraction container are within a suitable range, thereby facilitating the obtaining of desirable properties for use as a beverage extraction container.

Moreover, other materials such as an aliphatic polyester copolymer can be used within a range that does not impair biodegradability. Examples of aliphatic polyester copolymers include poly($\alpha$-hydroxy acid) or copolymers having these as the main repeating unit elements thereof, poly($\omega$-hydroxyalkanoates) in the manner of poly($\varepsilon$-caprolactone) or poly($\beta$-propiolactone), poly($\beta$-polyhydroxyalkanoates) in the manner of poly-3-hydroxypropionate, poly-3-hydroxyheptanoate or poly-3-hydroxyoctanoate, and copolymers having repeating unit elements composed thereof and repeating unit elements composed of poly-3-hydroxyvalerate or poly-4-hydroxybutyrate. In addition, other examples include polyalkylene dicarboxylates composed of a polycondensate of glycol and dicarboxylic acid such as polyethylene oxalate, polyethylene succinate, polyethylene adipate, polyethylene azelate, polybutylene oxalate, polybutylene succinate, polybutylene adipate, polybutylene sebacate, polyhexamethylene sebacate, polyneopentyl oxalate and polyalkylene dicarboxylate copolymers having repeating unit elements composed thereof. Moreover, other examples include those obtained by selecting and blending multiple types of these individual polymers having biodegradability. The aliphatic polyester copolymer is preferably polybutylene succinate (to also be referred to as PBS) from the viewpoints of compatibility with polylactic acid. The aliphatic polyester copolymer improves stretchability and adhesiveness of the nonwoven fabric during molding and facilitates the obtaining of favorable properties in terms of obtaining a desired shape, capacity and prevention of surface fluff

[Addition Ratio of Aliphatic Polyester Copolymer]

The aliphatic polyester copolymer added to the nonwoven fabric that composes the beverage extraction container of the present embodiment can be further contained in addition to the aforementioned polylactic acid-based polymer at 0.5 wt % to 30 wt % based on total resin weight. The added amount of the aliphatic polyester copolymer is 0.5 wt % to 30 wt %, preferably 3 wt % to 27 wt % and even more preferably 5% to 25% when the total resin weight is defined to be 100 wt %. If the added amount is within these ranges, crystallinity can be easily adjusted and a beverage extraction container can be obtained that exhibits superior thermal properties.

[Other Additives]

One type or two or more types of additives may be added to the fibers that compose the nonwoven fabric comprising the beverage extraction container of the present embodiment according to the purpose of use, and examples thereof include other resins, copolymers other than the aliphatic polyester copolymer, flame retardants, inorganic fillers, softeners, plasticizers, pigments, antistatic agents and water permeability agents.

[Long Fibers (Filaments) (Including Nonwoven Fabric Production) and Short Fibers (Staples)]

The nonwoven fabric composing the beverage extraction container of the present embodiment is obtained by a known spunbonding method, melt blowing method, air laying method, carding method or papermaking method and the like. Embossing, thermal bonding, columnar flow confounding, mechanical confounding or needle punching and the like can be used as methods for adhering the nonwoven fabric. A continuous, long-fiber nonwoven fabric obtained by spunbonding is preferable from the viewpoints of strength of the beverage extraction container and reducing the shedding of fibers during beverage extraction.

Although there are no particular limitations on the nonwoven fabric composing the beverage extraction container of the present embodiment provided it has stretchability that allows the obtaining of a molded body shape, fibers obtained by spunbonding at a low spinning speed of 500 m/min to 3000 m/min are used preferably, while those obtained at a spinning speed of 600 m/min to 2700 m/min are more preferable, and those obtained at a spinning speed of 700 m/min to 2500 m/min are even more preferable. In general, in the case of a rapid spinning speed, yarn immediately after spinning has high crystallinity and orientation, while in the case of a slow spinning speed, the resulting yarn has low crystallinity and orientation. A beverage extraction container of a molded body molded using a nonwoven fabric having suitable crystallinity and orientation is free of breakage (absence of breakage during molding) and has superior content retention.

In general, since a short-fiber nonwoven fabric exhibits a loss of yarn adhesion during molding resulting in yarn lifting from the surface of the beverage extraction container resulting in considerable fluff or having the potential for fiber shedding, a long-fiber nonwoven fabric is preferable for use as the beverage extraction container of the present embodiment.

[Form of Long Fibers]

The shape of the long-fiber nonwoven fabric composing the beverage extraction container of the present embodiment may consist of a single layer within a multilayer nonwoven fabric such as SS, SMS, SMMS or SMSM. Furthermore, S refers to a spunbonded long-fiber nonwoven fabric, while M refers to a melt blown ultrafine nonwoven fabric. In the case of using a multilayered nonwoven fabric such as SMS, SMMS or SMSM, dispersion unevenness of the fibers can be reduced and a beverage extraction container can be obtained that has superior content retention and resistance to powder leakage.

[Nonwoven Fabric Layering Method]

The nonwoven fabric composing the beverage extraction container of the present embodiment uses a low melting point resin for at least one of multiple layers by layering one layer, two layers or three layers or more. Alternatively, the use of core-sheath fibers having a difference in melting points makes it possible to impart and enhance fiber adhesiveness, and the occurrence of surface fluffing and sealability with a cover material in a beverage extraction container can be made favorable.

[Fiber Shape]

Although there are no particular limitations thereon, the shape of the fibers of the nonwoven fabric that composes the beverage extraction container of the present embodiment is such that a round shape, flat shape or C-shape, Y-shape, V-shape or other irregularly-shaped cross-section is employed, the shape preferably has a round cross-section and moreover, may have a sea-island structure, core-sheath structure or split fiber structure.

[Embossing]

Although embossing may be carried out on the nonwoven fabric composing the beverage extraction container of the present embodiment, the surface of the fibers of the nonwoven fabric may also be subjected to point adhesion. Although there are no particular limitations on the method used for single-point compression bonding, examples of preferable methods include a method using a pair of embossing rollers having an irregular surface pattern on the surface of at least one of the rollers and a method using a pair of flat rollers having flat surfaces. In addition, needle punching, spunlacing or felt calendering processing may also be carried out. Point adhesion refers to mild thermal adhesion and consists mainly of point adhesion on the fiber surfaces, and even if an embossing pattern is imparted by temporary thermocompression bonding, heat shrinkage appears microscopically in the periphery of the embossing pattern as a result of the thermal adhesion of the second stage being inhibited in the planar direction, and together with the embossing pattern being removed or weakening, adhesion occurs in a state in which unevenness in basis weight throughout the entire biodegradable nonwoven fabric is reduced.

Although there are no particular limitations thereon, the compression bonding area ratio attributable to embossing processing and point adhesion is preferably 3% to 50% and more preferably 5% to 40% relative to the entire nonwoven fabric area. Compression bonding area ratio can be measured by observing the surface of the nonwoven fabric composing the beverage extraction container using a microscope.

[Common Molding Processing Methods]

The beverage extraction container of the present embodiment can be obtained by three-dimensionally molding a nonwoven fabric composed of a biodegradable resin. Vacuum molding, pressure forming or press molding, for example, can be used for the molding method. Press molding is used preferably from the viewpoint of reducing susceptibility to the effects of air permeability of the nonwoven fabric. The molding mold can be suitably selected corresponding to the purpose, and although a concave-convex mold such as a metal mold, wooden mold or plastic mold, or a mold such as a convex mold or concave mold, can be used either at normal temperature or when heated, a heated mold is used preferably in consideration of improving tracking of the mold and obtaining a nonwoven fabric molded body having a favorable shape without breaking.

[Explanation of Molding in Consideration of Polymer Properties and Preheating]

When considered from the viewpoint of the resin properties of polylactic acid in comparison with polyester resin, although polyester allows the obtaining of a molded body by raising the mold temperature during molding since it has a higher melting point, larger difference between melting point and glass transition temperature and faster crystallization rate, as a result of polylactic acid having a low melting point, small difference between melting point and glass transition temperature and slow crystallization rate, it is difficult for sufficient heat to be imparted to the nonwoven fabric for molding thereby preventing the molding temperature from becoming high. Accordingly, it is preferable to preheat the nonwoven fabric prior to molding to a temperature equal to or higher than the glass transition temperature but equal to or lower than the melting point when carrying out molding processing on the beverage extraction container of the present embodiment. As a result of preheating the nonwoven fabric, tracking of the mold can be improved and a nonwoven fabric molded body having a favorable shape can be obtained without breaking and with little stretching unevenness.

Furthermore, typical resin properties of polylactic acid and polyester in that order are indicated as follows: melting point: 170° C., 260° C.; recrystallization temperature: 70° C., 120° C.; glass transition temperature: 55° to 60° C., 70° C. to 80° C.; specific heat: 1.38 J/g·K, 1.00 J/g·K to 1.15 J/g·K; thermal conductivity: 0.13 W/m·K, 0.2 W/m·K to 0.33 W/m·K; crystallization half-time: 500 seconds to 900 seconds, 50 seconds to 100 seconds.

Examples of methods used to heat or preheat the nonwoven fabric include the use of a heating oven using infrared rays, hot air or heating element, and the use of an infrared heater, hot air heater or heating element heater.

[Temperature of Nonwoven Fabric Prior to Molding]

The temperature of the nonwoven fabric prior to molding is preferably 55° C. to 160° C., more preferably 60° C. to 150° C. and even more preferably 75° C. to 140° C. If the temperature of the nonwoven fabric prior to molding is within these ranges, a container having a desired shape can be obtained. If the temperature of the nonwoven fabric prior to molding is excessively high, heat shrinkage occurs during container production, stress is generated in the shape of the resulting beverage extraction container, thickness becomes non-uniform, stretching unevenness occurs, and properties such as shape retention, extractability or contents retention may be inadequate for use as a beverage extraction container. If the temperature of the nonwoven fabric prior to molding is excessively low, breakage occurs during molding, thereby sometimes preventing the obtaining of a container shape.

[Mold Temperature During Molding]

The temperature of the molding mold can be suitably selected provided there is no breakage of the nonwoven fabric during molding and there is no adherence to the mold, and is preferably 30° C. to 160° C., more preferably 80° C. to 150° C. and even more preferably 100° C. to 140° C.

The temperature of the nonwoven fabric prior to molding and the temperature of the molding mold are preferably selected on consideration of the balance between the two. A small difference between the temperature of the nonwoven fabric prior to molding and the temperature of the molding mold enables stretching unevenness of the nonwoven fabric to be reduced and is preferable in terms of such properties as the shape retention, extractability and content retention of the resulting beverage extraction container.

[Combining Preheating and Mold]

Although the temperatures of the nonwoven fabric and mold during molding can be suitably selected, in order to obtain a beverage extraction container having a favorable shape at normal temperature, it is preferable to carrying out heated molding with a concave-convex mold or heated molding after preheating the nonwoven fabric to enhance thermal conductivity to the nonwoven fabric and suppress shrinkage when removing the mold.

[Heat Setting and Cooling]

In order to obtain a container having a favorable shape for the beverage extraction container of the present embodiment, a method may be employed consisting of applying hot air during molding, providing an adequate heat setting time such as by leaving the mold in contact with a nonwoven fabric for a certain amount of time after molding, removing from the mold after allowing to cool sufficiently, and further contacting a heated mold and cooling mold after heated molding. Although heat setting time can be suitably selected in consideration of productivity, it is preferably 0.01 seconds or more, more preferably 0.2 seconds or more and even more preferably 0.2 seconds to 300 seconds. Increasing heat setting time makes it possible to suppress shrinkage after molding and when immersing in boiling water. Cooling after molding can be carried out by contacting with cold air after molding or using a cooled mold or room temperature mold, and it is effective to lower the temperature to a temperature equal to or lower than the glass transition temperature of the material composing the nonwoven fabric after molding. As a result, shrinkage immediately after molding can be suppressed and a molded body can be obtained that has an attractive shape after molding.

[Container Shape]

Although there are no particular limitations on the shape of the beverage extraction container of the present embodiment provided it is the shape of a container, preferable examples thereof include a shape having a curved bottom, cylindrical shape, truncated conical shape, dome shape, hemispherical shape and bowl shape. These shapes can be obtained by making the shape of the mold used during molding to have a shape having a curved bottom, cylindrical shape, truncated conical shape, dome shape, hemispherical shape or bowl shape. The nonwoven fabric molded body serving as the beverage extraction container can be used with or without enclosing in a resin container. In the case of not enclosing in a resin container, the nonwoven fabric molded body is superior from the viewpoints of the container not being bulky, handling ease and production cost.

[Molding Index]

The degree to which the nonwoven fabric of the beverage extraction container of the present embodiment is molded is represented with the molding index. Molding index refers to the value defined in the following equation (1) that is determined by dividing the surface area of the molded body by the area of the flat nonwoven fabric prior to molding that is used for the molded body (area of the opening in the case of being in the form of a container):

$$\text{Molding index} = (\text{surface area of molded body cm}^2)/(\text{area of nonwoven fabric prior to molding cm}^2)$$

The molding index of a molded body composed of the nonwoven fabric of the beverage extraction container of the present embodiment is preferably 1.1 or more, more preferably 1.1 to 20, even more preferably 1.5 to 10, still even more preferably 2.0 to 6 and most preferably 2.5 to 6. In the case the molding index is large, this indicates that elongation of the nonwoven fabric is large. On the other hand, in the case the molding index is small, this indicates that elongation of the nonwoven fabric is small. In the case the molding index is not excessively large, the nonwoven fabric can be molded without breaking and content retention of the resulting molded body is favorable, while in the case the molding index is not excessively small, the molded body is able to have a suitable size when contents are filled into a container.

[Bonding with Other Materials]

Although the beverage extraction container of the present embodiment does not negate combination with non-oriented paper or nonwoven fabric, in order to produce a container shape, other steps for lamination or adhesion and the like may be necessary resulting in difficulties in production.

[Explanation of Common Extraction Methods]

When extracting the beverage extraction container using an extractor (such as a single-serve type), hot water is poured into the beverage extraction container filled with an extracted substance after having been placed in the apparatus. The beverage extraction container is required to have heat stability and stability with respect to changes in stress attributable to expansion of the extracted substance.

[Shrinkage During Extraction and TMA Shrinkage of Molded Body]

The maximum value of dimensional change rate in the MD direction when applying a load of 0.05 N/2 mm to a nonwoven fabric molded body piece composing the beverage extraction container of the present embodiment at 30° C. to 100° C. as determined by thermomechanical analysis (TMA) is preferably 4% or less and more preferably 3% or less. If the maximum value of dimensional change rate is within these ranges, since, at the time of beverage extraction, there is little fiber elongation, breakage or separation of fiber intersecting points caused by application of heat or stress attributable to expansion of the extracted substance during extraction, it is difficult for the beverage extraction container to expand, there is no contact with the needle of the extractor, and the nonwoven fabric is resistant to breakage. Dimensional change rate can be measured as indicated in the examples.

In the beverage extraction container of the present embodiment, the MD direction refers to the direction in which the number of fibers aligned in the same direction is large, and in the production of a nonwoven fabric, refers to the direction of machine flow.

[Change in Capacity During Immersion in Boiling Water]

The change in capacity of the beverage extraction container of the present embodiment when immersed in boiling water is preferably 20% to 90%, more preferably 30% to 85%, even more preferably 30% to 80%, and most preferably 45% to 75%. If the change in capacity is within these ranges, balance can be achieved between the dimensional changes of the extracted substance and beverage extraction container during beverage extraction, thereby enabling the beverage extraction container to be used without causing breakage due to insufficient strength or elongation of the nonwoven fabric molded body per se or breakage caused by contact with a portion of the extractor (such as a needle installed below the installed location of the beverage extraction container). In general, when a beverage extraction container is used in a beverage extraction device by a method consisting of pouring hot water into the container and extracting a beverage, such as a single serve method, it is preferable that heat shrinkage be low from the viewpoints of shape stability and prevention of cover separation.

On the other hand, the technology of the present application allows the obtaining of a beverage extraction container having superior stability during extraction as a result of achieving balance between expansion of black tea, green tea, ground coffee, medicine, herbal medicine or other extracted substance caused by pouring hot water thereon and dimensional change of the beverage extraction container.

[Birefringence]

Birefringence of the nonwoven fabric molded body composing the beverage extraction container of the present embodiment is preferably 0.010 or more, more preferably 0.012 to 0.050 and even more preferably 0.012 to 0.030. In the case birefringence is not excessively high, molding can be carried out without any excessive orientation of fibers during molding, adhesion of the fibers is suitably maintained, and lifting of fibers from the surface of the extraction container can be inhibited. In the case birefringence is not excessively low, orientation is not excessively low, there is little adhesion of the nonwoven fabric to the mold during molding, and surface properties of the resulting container are favorable. Moreover, if birefringence is within the aforementioned ranges, shape retention of the extraction container during beverage extraction in a hot environment can be enhanced. If birefringence is excessively high, adhesion among fibers becomes poor and the surface of the extraction container is susceptible to the formation of fluff.

[Degree of Crystallinity]

The degree of crystallinity of the nonwoven fabric molded body composing the beverage extraction container of the present embodiment is preferably 30% to 70%, more preferably 30% to 60% and even more preferably 40% to 50%. In the case degree of crystallinity is within these ranges, the shape of the beverage extraction container in a hot environment is not subjected to strain and shape retention of the extraction container during beverage extraction in a hot environment can be enhanced.

[Converted Basis Weight of Nonwoven Fabric Composing Beverage Extraction Container]

The total basis weight of the nonwoven fabric molded body composing the beverage extraction container of the present embodiment is 20 g/m$^2$ to 350 g/m$^2$, preferably 20 g/m$^2$ to 300 g/m$^2$, more preferably 30 g/m$^2$ to 300 g/m$^2$ and most preferably 50 g/m$^2$ to 250 g/m$^2$. If total basis weight is 20 g/m$^2$ or more, strength of the beverage extraction container is adequate, while on the other hand, if total basis weight is 350 g/m$^2$ or less, processing can be carried out without applying a large load to the molding processing equipment when obtaining a beverage extraction container. Furthermore, the total basis weight of the nonwoven fabric used in the beverage extraction container can be calculated from the area (m$^2$) of the nonwoven fabric prior to molding and the weight (g) of the nonwoven fabric used in the beverage container.

[Average Fiber Diameter of Nonwoven Fabric Composing Beverage Extraction Container]

The average fiber diameter of the nonwoven fabric molded body composing the beverage extraction container of the present embodiment is preferably 8 μm to 50 μm, more preferably 10 μm to 40 μm and even more preferably 15 μm to 30 μm. In the case average fiber diameter is not excessively small, contents can be retained as a container (favorable resistance to powder leakage), and in the case average fiber diameter is not excessively large, liquid permeation rate is not excessively slow.

[Basis Weight of Nonwoven Fabric Composing Beverage Extraction Container]

The basis weight of the nonwoven fabric molded body composing the beverage extraction container of the present embodiment is preferably 12 g/m$^2$ to 200 g/m$^2$, more preferably 18 g/m$^2$ to 100 g/m$^2$, even more preferably 30 g/m$^2$ to 80 g/m$^2$ and most preferably 30 g/m$^2$ to 60 g/m$^2$. If basis weight of the nonwoven fabric is within these ranges, contents can be retained as a container (favorable resistance to powder leakage) and liquid permeation rate is not excessively slow.

[Resistance to Powder Leakage]

When extracting an extracted substance such as black tea, green tea, ground coffee, medicine or herbal medicine with an extractor using the beverage extraction container of the present embodiment, the amount of powder contained in the extract can be made to be a desired amount of powder by suitably setting such parameters as the fiber diameter, total basis weight, basis weight or molding conditions of the nonwoven fabric molded body. The amount of powder can be made to be 0.25 g or less or even 0.20 g or less. In the case of desiring to reduce the amount of tea leaves or powder of the extracted substance in the beverage, molding conditions may be suitably set such as decreasing fiber diameter, decreasing total basis weight, decreasing basis weight, or reducing temperature unevenness in the nonwoven fabric during molding and eliminating molding unevenness. On the other hand, in the case of desiring to leave an extracted substance such as tea leaves in the beverage, molding conditions may be suitably set such as by increasing fiber diameter, increasing total basis weight, increasing basis weight or increasing temperature unevenness in the nonwoven fabric during molding.

[Change in Capacity Before and After Extraction]

The change in capacity of the beverage extraction container of the present embodiment before and after extraction can be −30% to 30%, −20% to 20% or −10% to 10%. If the change in capacity before and after extraction is within this range, balance can be achieved between dimensional change of the extracted substance and beverage extraction container during beverage extraction, thereby enabling the beverage extraction container to be used without causing breakage attributable to a lack of strength or elongation of the nonwoven fabric molded body per se or causing breakage attributable to contact with a portion of the extractor (such as a needle installed below the installed location of the beverage extraction container).

[Surface Fluff]

The number of fluff fibers of the nonwoven fabric composing the beverage extraction container of the present embodiment is preferably 10 or less, more preferably 0 to 9, and even more preferably 0 to 3. If the number of fluff fibers is within these ranges, appearance as a product is favorable, and there is no exacerbation of surface properties caused by rubbing between adjacent beverage extraction containers due to vibrations and so forth during transport or catching of fibers on surface irregularities of the portion of the extractor where the container is installed, thereby resulting in superior handling.

[Cover]

The beverage extraction container of the present embodiment can be covered with a cover made of a film or nonwoven fabric and the like, after being filled with contents. Although there are no particular limitations thereon, examples of methods that can be used to seal the cover include coating with an adhesive or thermoplastic resin, coating the cover material with an adhesive, adding or blending a thermoplastic resin to the cover material, and in the case of a nonwoven fabric, using a nonwoven fabric that uses a resin for the sheath that has a lower melting point than the core. The cover may be attached to a degree such that the cover does not come off and contents do not leak during use in an extractor.

EXAMPLES

The following provides a more detailed explanation of the present invention.

First, measurement and evaluation methods are explained.

Evaluation of Nonwoven Fabric Properties (1) Average Fiber Diameter (μm)

A suitable number of fibers are respectively sampled from locations at 10 cm intervals over the width of the fiber web, nonwoven fabric or other sample except for 5 cm from both edges of the fabric, and the diameters of the fibers are measured with a microscope at 30 locations each followed by calculating the average value of the measured values.

(2) Basis Weight (g/m$^2$)

Samples were cut out so as to have a total area of 1500 cm$^2$ (such as 3 pieces measuring 20 cm wide by 25 cm long) followed by determination of basis weight by converting to weight per unit area in accordance with JIS L-1913.

(3) Birefringence (Δn)

The distribution of average refractive index as observed from the side of a fiber can be measured according to the interference fringe method using the Olympus BX53. This method can be applied to fibers having a round cross-section. The refractive index of a fiber is characterized by refractive index n∥ with respect to polarized light having an electric field vector parallel to the fiber axis and refractive index n⊥ with respect to polarized light having an electric field vector perpendicular to the fiber axis, and birefringence is represented by Δn=(n∥−n⊥).

When a fiber is irradiated with polarized light, the polarized light is divided into two components that oscillate at mutually right angles. Since the refractive index of the fiber differs depending on the direction of the axis, a difference occurs in the distance traveled by the two light components. This is referred to as retardation and is represented by R, and when the diameter of the fiber cross-section is defined as dθ, is related to birefringence in the manner of the following equation.

$$R = d0(n\| - n\perp) = d0 \Delta n$$

Fibers sampled from a sample using an optically flat slide glass or cover glass are immersed in a mounting agent that is inert with respect to the fibers. A portion of the fibers where corresponding fibers do not overlap in the measurement area are made to be such that the fiber axis thereof is perpendicular to the optical axis and interference fringes of a polarizing microscope. The pattern generated by the interference fringes is measured to determine retardation followed by measuring the birefringence of the fibers and determining the average of ten fibers.

(4) Elongation at 120° C. (%)

A sample measuring 3 cm wide and 10 cm long was cut out except for 5 cm on both ends of the sample followed by measuring five points each in the longitudinal direction with a tensile tester at a clamping interval of 2 cm, pulling speed of 200 mm/min and temperature of 120° C. and calculating the average value thereof. Furthermore, after placing the sample in a thermostatic chamber and allowing the passage of one minute, measurement was started after confirming that the chamber temperature had reached 120° C.

(5) Value Obtained by Dividing Longitudinal Tear Strength by Basis Weight (-)

Three samples measuring 10 cm wide by 6.5 cm long were cut out except for 5 cm on both ends of the samples followed by measuring longitudinal tear strength (N) using an Elmendorf tearing tester and determining the average value thereof. This was then calculated by dividing by basis weight.

(6) Dimensional Change Rate in MD Direction Determined by Thermomechanical Analysis (%)

Samples measuring 2 mm wide by 25 mm long were cut out except for 5 cm on both ends of the samples so that the basis weight measured in (2) was ±10% followed by measuring with the TA Instruments TMAQ400 using a film/fiber clamp for the upper portion of the clamp and an aluminum ball manufactured by TA Instruments for the lower portion of the clamp at an initial load of 0.005 N, temperature of 30° C. to 160° C. raised at the rate of 10° C./minute and chucking length of 15 mm. Dimensional change rate (%) was determined according to dimensional change (μm)/{chucking length (mm)×1000}×100 at 80° C. to 140° C. Average value was then calculated after measuring N=3 samples.

(7) Evaluation of Temperature Dependency of Storage Modulus

Samples measuring 5 mm wide by 25 mm long were cut out and measured with the DMA2980 manufactured by TA Instruments Japan using a film/fiber clamp at an initial load of 0.010 N, frequency of 1 Hz, strain of 1%, temperature of 30° C. to 150° C. raised at the rate of 3° C./minute, and chucking length of 10 mm.

Furthermore, the change rate of elastic modulus relative to temperature can be calculated according to the following equation in which the change in elastic modulus when carrying out a temperature dependency test of dynamic viscosity was divided by the change in temperature.

Temperature dependency test of dynamic viscosity=−Δstorage modulus/Δtemperature (8) Fluff Grade (Rank)

A test piece measuring 25 mm×300 mm was sampled in the MD direction and was evaluated according to the criteria indicated below, using a color fastness rubbing tester of the Japan Society for the Promotion of Science at a friction block load of 250 g, using the same fabric on the side of the friction block, and rubbing 50 times. Furthermore, the sample was measured on both the front and back sides and the side having the lower rank was used.

Rank 5.0: No fluff
Rank 4.0: Fluff consisting of about 1 to 2 fibers or small fuzzballs beginning to form at a single location
Rank 3.5: Fluff consisting of about 3 to 5 fibers and small fuzzballs beginning to form at multiple locations.
Rank 3.0: Well-defined fuzzballs beginning to form or multiple small fuzzballs observed.
Rank 2.5: Large, well-defined fuzzballs observed and fibers beginning to lift at multiple locations.
Rank 2.0: Extensive fiber separation causing a reduction in thickness of the test piece,
Rank 1.0: Considerable fiber separation causing destruction of test piece.

(9) R/Ave Value of Basis Weight Distribution of 2.5 cm Square of Biaxially Stretched Sheet A sample was cut out into a square measuring 12.5 cm per side and used to prepare a stretched sheet with a biaxial stretching device by biaxially stretching in the MD/CD directions to 20 cm simultaneously at a clamping interval of 8 cm, pulling speed of 200 mm/min and temperature of 120° C. The stretching ratio at this time was 2.5 times the length in each of the MD and CD directions and the area magnification was 6.25. Furthermore, after placing the sample in a thermostatic chamber and allowing the passage of one minute, stretching was started after confirming that the chamber temperature reached 120° C.

A square measuring 10 cm on a side was drawn in the center of the resulting stretched sheet and a lattice consisting of 16 squares measuring 2.5 cm on a side was drawn therein. The 16 2.5 cm squares that were drawn were cut out and weighed. R/Ave is the value defined by the following formula:

$R$ (maximum value−minimum value of weight of 16 squares)/Ave (average value of weight of 16 squares)

(10) Moldability

The biodegradable nonwoven fabric was placed in a molding machine, preheated for 1 minute at a hot air temperature of 100° C. and the status of the molded body was observed after having carried out press molding for 2 seconds using a cylindrical mold (diameter: 4.4 cm, height: 1.3 cm and 3.2 cm) at 120° C. and a nonwoven fabric temperature of 60° C. followed by evaluating according to the criteria indicated below. Furthermore, molding index refers to the value defined in the following equation that is determined by dividing the area of the molded body by the area of the flat nonwoven fabric used for the molded body prior to molding (area of the opening in the case of being in the form of a container).

Molding index=(surface area of molded body $cm^2$)/(area of nonwoven fabric prior to molding $cm^2$)

A: No breakage, favorable moldability, molding index of 1.9 or higher for 1.3 cm high mold and molding index of 3.4 or higher for 3.2 cm high mold
B: No breakage but problems such as specks on the surface of the molded body, stretching unevenness and conspicuous yarn fluff
C: Breakage, poor moldability and problems such as not obtaining molding index of 1.9 or higher for 1.3 cm high mold and not obtaining molding index of 3.4 or higher for 3.2 cm high mold

(11) Compost Treatment Test

The status of the test piece was visually observed after treating for 4 weeks in a constant-temperature environment at 60° C. using a compost treatment tester followed by evaluating according to the criteria indicated below.

A: Sample decomposed into small pieces
C: No change in sample appearance observed

(12) Moldability (Uniform Moldability)

A long-fiber nonwoven fabric was placed in a molding machine having 10 rows of molding molds arranged in the direction of width followed by carrying out press molding for 2 seconds using a cylindrical mold (diameter: 4.4 cm, height: 3.2 cm) at 120° C. and using a nonwoven fabric temperature of 100° C. by heating with hot air, filling with 11 g of model particles having a particle diameter of 100 μm, sealing by heat sealing using a PLA sheet for the cover material and producing 100 molded bodies.

A 1 cm square was cut out of the bottoms of the resulting molded bodies followed by measurement of the weight thereof.

R/Ave is the value defined by the following equation.

$R$ (maximum value−minimum value of weight of 100 squares)/Ave (average value of weight of 100 squares)

(Evaluation of Molded Body Properties)
(1) Average Fiber Diameter (μm)

A suitable number of fibers were respectively sampled from the side (portion where the nonwoven is stretched) of the nonwoven fabric molded body used in the beverage extraction container followed by measuring the diameter of the fibers with a microscope at 30 locations and calculating the average value of the measured values.

(2) Converted Basis Weight of Nonwoven Fabric (g/m²)

Converted basis weight of the nonwoven fabric was determined by converting to weight per unit area from the weight (g) of the nonwoven fabric molded body used in the beverage extraction container and the area (m²) of the flat nonwoven fabric prior to molding used in the nonwoven fabric molded body (area of the opening in the case of being in the form of a container).

Converted basis weight of nonwoven fabric (g/m²)= weight (g) of nonwoven fabric/area (m²) of flat nonwoven fabric prior to molding used in molded body (3) Basis Weight of Molded Body (g/m²)

Basis weight of the molded body was determined by converting to weight per unit area from the weight (g) of the nonwoven fabric sampled from the nonwoven fabric molded body used in the beverage extraction container and the area (m²) of the nonwoven fabric. In the case the nonwoven fabric is curved, the nonwoven fabric is cut into narrow strips and smoothened followed by measuring area of the nonwoven fabric with a microscope.

Basis weight of molded body (g/m²)=weight (g) of nonwoven fabric/area prior to molding (m²)

(4) Birefringence (Δn)

Birefringence was measured according to the interference fringe method in the same manner as birefringence of the nonwoven fabric using the Olympus BX53. The test piece was sampled from the side of the nonwoven fabric molded body (location where the stretching ratio is high).

(5) Degree of Crystallinity (%)

Degree of crystallinity was measured using the same method used to measure degree of crystallinity of the nonwoven fabric using the Model DSC6000 Differential Scanning calorimeter manufactured by PerkinElmer.

(6) Dimensional Change Rate in MD Direction

A sample measuring 2 mm wide and 25 mm high was cut out in the MD direction from the side of the nonwoven fabric molded body used in the beverage extraction container (portion of container having large change in stretching) followed by measuring with the Texas Instruments TMAQ400 (thermomechanical analyzer (TMA)) using a film/fiber clamp for the upper portion of the clamp and an aluminum ball manufactured by Texas Instruments for the lower portion of the clamp at an initial load of 0.005 N, temperature of 30° C. to 100° C. raised at the rate of 10° C./minute and chucking length of 15 mm. Dimensional change rate (%) was determined according to dimensional change (μm)/{chucking length (mm)×1000} at 30° C. to 100° C. followed by determining the maximum value over the temperature range of 30° C. to 100° C. Average value was then calculated after measuring N=5 samples. A positive dimensional change rate represents elongation.

(7) Change in Capacity During Immersion in Boiling Water

Change in capacity before and after immersing in boiling water was determined by immersing an (empty) beverage extraction container in boiling water and allowing to air-dry followed by determining the average value of N=5 containers. Container capacity was measured using the weight of a standard powder (powder for which the amount thereof that passes through a 150 μm mesh sieve in a sieve test is 0.05% or less) able to be filled into the container.

Change in capacity (%)=filled weight of standard powder before immersion in boiling water (g)-filled weight of standard powder after immersion in boiling water (g)×100/filled weight of standard powder before immersion in water (g)

(8) Surface Fluff

The number of fluff fibers on the surface of the beverage extraction container was measured followed by determining the average value of N=10 fibers.

(9) Extractability: Resistance to Powder Leakage

A beverage extraction container filled with ground coffee (consisting of 0.05% or less of powder able to pass through a 150 μm mesh sieve, filled amount: 11 g (or filled with maximum amount in the case the container is too small and cannot be filled with 11 g)) was placed in an extractor manufactured by Keurig, and coffee extracted with 170 ml of hot water was filtered using No. 2 Filter Paper manufactured by Advantec followed by drying for 6 hours in a dryer and measuring the amount of powder remaining on the filter paper. Measurements were carried out for N=10 containers and the average value thereof was taken to be the amount of escaped powder.

(10) Extractability: Change in Volume after Extraction

The change in capacity before and after extraction was determined for the beverage extraction containers following extraction in (9) above and the average value of N=5 containers was determined. Container capacity was measured using the weight of a standard powder (powder for which the amount thereof that passes through a 150 μm mesh sieve in a sieve test is 0.05% or less) able to be filled into the container.

Change in capacity during extraction (%)=(filled weight of standard powder before extraction (g)-filled weight of standard powder after extraction (g))×100/filled weight of standard powder before extraction (g)

(11) Extractability: Cover Sealability

A beverage extraction container having a standard powder (powder for which the amount thereof that passes through a 150 μm mesh sieve in a sieve test is 0.05% or less, filled amount: 11 g) enclosed therein was immersed in boiling water for 1 minute followed by evaluating visually for the presence or absence of cover separation according to the criteria indicated below.

A: No separation (favorable sealability)

C: Separation (poor sealability)

(12) Moldability

The appearance of the nonwoven fabric molded body was observed and then evaluated according to the criteria indicated below. Furthermore, molding index is the value defined by the following equation as determined by dividing the surface area of the molded body by the area of the flat nonwoven fabric used in molding prior to molding (area of the opening in the case of being in the form of a container):

Molding index=(surface area of molded body cm²)/ (area of nonwoven fabric prior to molding cm²)

4: Molding index of 2.0 or more and absence of breakage

3: Molding index of 2.0 or more and absence of breakage but problems observed such as specks present on surface of molded body, stretching unevenness and conspicuous yarn fluff 2: Absence of breakage but molding index of less than 2.0

1: Presence of breakage

(13) Biodegradability (Compost Treatment Test)

The status of a test piece was observed visually after 4 weeks in a constant-temperature environment of 60° C.

using a compost treatment tester followed by evaluating according to the evaluation criteria indicated below.

A: Sample decomposed into small pieces
C: No change in sample appearance observed The following provides an explanation of evaluations carried out on the properties of the nonwoven fabric.

Example 1

10 wt % of polybutylene succinate (melting point: 110° C.) was added to polylactic acid having an MFR value of 44 g/10 min at a temperature of 230° C. followed by melting and kneading with a single-screw extruder and extruding with the filament group facing towards the moving collection surface by spunbonding at a discharge rate of 0.9 g/minute·hole, spinning temperature of 220° C. and spinning speed of 1011 m/min to produce a biodegradable long-fiber web (round cross-section).

Next, temporary compression bonding was carried out using a pair of embossing rollers having an irregular surface pattern on the surface of one of the rollers. The embossing rollers used had a compression bonding area ratio of 14% and temporary compression bonding was carried out at a roller linear pressure of 300 N/cm under conditions of upper and lower roller temperatures of 45° C.

Next, this temporary compression-bonded web was subjected to heat treatment with a felt calendering machine (drum diameter: 2,500 mm, temperature: 135° C., processing speed: 10 m/min) 72 hours after having stored at 30° C. to obtain a biodegradable long-fiber nonwoven fabric (basis weight: 250 g/m$^2$, fiber diameter: 30 μm).

The biodegradable long-fiber nonwoven fabric was placed in a molding machine and press-molded for 2 seconds using a cylindrical mold (diameter: 4.4 cm, height: 1.3 cm or 3.2 cm) at 120° C. after preheating at a hot air temperature of 100° C. to produce a molded body.

Examples 2 and 3

Biodegradable long-fiber nonwoven fabrics and molded bodies were produced in the same manner as Example 1 with the exception of changing the basis weight of the biodegradable long-fiber nonwoven fabrics to 90 g/m$^2$ and 25 g/m$^2$, respectively.

Example 4

A biodegradable long-fiber nonwoven fabric and molded body were produced in the same manner as Example 1 with the exception of changing the basis weight of the biodegradable long-fiber nonwoven fabric to 15 g/m$^2$, changing fiber diameter to 12 μm, and changing the discharge rate to 0.7 g/minute·hole.

Example 5

A biodegradable long-fiber nonwoven fabric and molded body were produced in the same manner as Example 4 with the exception of changing the basis weight of the biodegradable long-fiber nonwoven fabric to 150 g/m$^2$ and changing the discharge rate to 0.7 g/minute hole.

Example 6

A biodegradable long-fiber nonwoven fabric and molded body were produced in the same manner as Example 1 with the exception of changing the felt calendering temperature to 125° C., changing the basis weight of the biodegradable long-fiber nonwoven fabric to 310 g/m$^2$, and changing fiber diameter to 38 μm.

Examples 7 and 8

Biodegradable long-fiber nonwoven fabrics and molded bodies were produced in the same manner as Example 2 with the exception of changing the amount of polybutylene succinate added to 5 wt % or 25 wt %.

Example 9

A biodegradable long-fiber nonwoven fabric and molded body were produced in the same manner as Example 2 with the exception of changing the amount of polybutylene succinate added to 35 wt % and changing the basis weight of the biodegradable long-fiber nonwoven fabric to 150 g/m$^2$.

Example 10

A biodegradable long-fiber nonwoven fabric and molded body were produced in the same manner as Example 2 with the exception of changing the basis weight of the biodegradable long-fiber nonwoven fabric to 150 g/m$^2$.

Example 11

A biodegradable long-fiber nonwoven fabric and molded body were produced in the same manner as Example 10 with the exception of changing the spinning speed to 805 m/min and fiber diameter to 34 μm.

Example 12

A biodegradable long-fiber nonwoven fabric and molded body were produced in the same manner as Example 10 with the exception of changing the spinning speed to 1160 m/min and fiber diameter to 28 μm.

Example 13

A biodegradable long-fiber nonwoven fabric and molded body were produced in the same manner as Example 10 with the exception of changing the spinning speed to 2519 m/min.

Example 14

A biodegradable long-fiber nonwoven fabric and molded body were produced in the same manner as Example 10 with the exception of changing the spinning temperature to 210° C., changing the spinning speed to 1345 m/min, heat treating with a felt calendering machine after storing for 1 hour at 30° C., and changing fiber diameter to 26 μm.

Example 15

A biodegradable long-fiber nonwoven fabric and molded body were produced in the same manner as Example 10 with the exception of changing the felt calendering temperature to 90° C.

Example 16

A biodegradable long-fiber nonwoven fabric and molded body were produced in the same manner as Example 10 with the exception of changing the felt calendering temperature to 160° C.

Example 17

A biodegradable long-fiber nonwoven fabric and molded body were produced in the same manner as Example 10 with the exception of heat treating with a felt calendering machine after storing for 720 hours at 50° C.

Example 18

A biodegradable long-fiber nonwoven fabric and molded body were produced in the same manner as Example 1 with the exception of changing the basis weight to 15 g/m².

Example 19

A biodegradable long-fiber nonwoven fabric and molded body were produced in the same manner as Example 2 with the exception of changing the amount of polybutylene succinate added to 2.5 wt %.

Example 20

A biodegradable long-fiber nonwoven fabric and molded body were produced in the same manner as Example 10 with the exception of changing the felt calendering temperature to 110° C.

Example 21

A biodegradable long-fiber nonwoven fabric and molded body were produced in the same manner as Example 20 with the exception of changing the basis weight to 50 g/m².

Comparative Example 1

A biodegradable long-fiber nonwoven fabric and molded body were produced in the same manner as Example 10 with the exception of not heat-treating with a felt calendering machine. Dimensional change rate was large and moldability was poor.

Comparative Example 2

A biodegradable long-fiber nonwoven fabric and molded body were produced in the same manner as Example 10 with the exception of heat-treating with a felt calendering machine after storing for 1 hour at 30° C. Dimensional change rate was large and moldability was poor.

Comparative Example 3

A molded body was produced in the same manner as Example 1 using a nonwoven fabric (Tm: 172° C., Tc: 83° C., Tg: 63° C.) consisting mainly of polylactic acid having a basis weight of 135 g/m², thickness of 0.49 mm (thickness measured at a load of 100 g/cm² according to the method defined in JIS L-1913), fiber diameter of 28 μm and compression bonding area ratio of 18% obtained by spinning polylactic acid having an MFR value at a temperature of 230° C. of 44 g/10 min using a known spunbonding method at a discharge rate of 0.9 g/minute·hole and spinning temperature of 220° C. Dimensional change rate was large and moldability was poor.

Comparative Example 4

A molded body was produced in the same manner as Example 1 using a nonwoven fabric consisting mainly of polylactic acid having a basis weight of 17.3 g/m², thickness of 0.09 mm (thickness measured at a load of 100 g/cm² according to the method defined in JIS L-1913), fiber diameter of 15 μm and compression bonding area ratio of 21% obtained by spinning polylactic acid having an MFR value at a temperature of 230° C. of 44 g/10 min using a known spunbonding method at a discharge rate of 0.9 g/minute·hole and spinning temperature of 220° C. Elongation was low and moldability was poor.

Comparative Example 5

A polyethylene terephthalate (PET) fiber web (melting point: 260° C., spinning speed: 1716 m/min, average fiber diameter: 22 μm, round cross-section) having a basis weight of 100 g/m² was produced by extruding polyethylene terephthalate having an MFR value at a temperature of 300° C. of 25 g/10 min by spunbonding at a discharge rate of 0.9 g/minute·hole and spinning temperature of 290° C. with the filament group facing towards the moving collection surface.

Next, partial thermocompression bonding was carried out using a pair of embossing rollers having an irregular surface pattern on the surface of at least one of the rollers. The embossing rollers used had a compression bonding area ratio of 14% and partial compression bonding was carried out at a roller linear pressure of 400 N/cm under conditions of upper and lower roller temperatures of 65° C.

Next, this partial compression-bonded web was subjected to heat treatment with a felt calendering machine (drum diameter: 2,500 mm, temperature: 130° C., processing speed: 15 m/min) after storing for 1 hour at 30° C. to obtain a polyethylene terephthalate long-fiber nonwoven fabric.

The biodegradable long-fiber nonwoven fabric was placed in a molding machine and press-molded for 2 seconds using a cylindrical mold (diameter: 4.4 cm, height: 1.3 cm or 3.2 cm) at 120° C. after preheating at a hot air temperature of 100° C. to produce a molded body.

Although the resulting polyethylene terephthalate nonwoven fabric was subjected to compost treatment, changes in appearance were unable to be observed.

Comparative Example 6

A long-fiber nonwoven fabric and molded body were produced in the same manner as Comparative Example 4 with the exception of changing the basis weight to 70 g/m².

Comparative Example 7

A long-fiber nonwoven fabric and molded body were produced in the same manner as Comparative Example 1 with the exception of changing the spinning speed to 1455 m/min.

Comparative Example 8

A long-fiber nonwoven fabric and molded body were produced in the same manner as Comparative Example 6 with the exception of changing the spinning speed to 1455 m/min.

The results obtained for Examples 1 to 21 and Comparative Examples 1 to 8 are shown in Table 1 (Tables 1-1 and 1-2).

TABLE 1

| Properties of Nonwoven Fabric for Molding | Units | Examples | | | | | | | | |
|---|---|---|---|---|---|---|---|---|---|---|
| | | 1 | 2 | 3 | 4 | 5 | 6 | 7 | 8 | 9 |
| Basis weight | g/m² | 250 | 90 | 25 | 15 | 150 | 310 | 90 | 90 | 150 |
| Fiber diameter | μm | 30 | 30 | 30 | 12 | 12 | 38 | 30 | 30 | 30 |
| Birefringence | [—] | 0.012 | 0.016 | 0.025 | 0.018 | 0.019 | 0.016 | 0.025 | 0.008 | 0.003 |
| Rupture elongation at 120° C. | % | 210 | 180 | 120 | 140 | 205 | 250 | 172 | 225 | 113 |
| Dimensional change rate at which dimensional change rate in MD direction at 80° C. to 140° C. as determined by thermomechanical analysis becomes maximum | [%] | −1.9 | −1.5 | −0.1 | −0.6 | −0.5 | −2.1 | −0.7 | −2.4 | −3.2 |
| Longitudinal tear strength | N | 4.9 | 1.4 | 0.5 | 0.1 | 7.1 | 6.2 | 2.7 | 8.0 | 3.0 |
| | N/(g/m²) | 0.020 | 0.016 | 0.020 | 0.007 | 0.047 | 0.020 | 0.030 | 0.089 | 0.020 |
| Storage modulus at 90° C. to 150° C. | Max | 65 | 65 | 45 | 41 | 205 | 182 | 77 | 48 | 39 |
| | Min | 32 | 34 | 23 | 19 | 53 | 42 | 38 | 23 | 11 |
| Max. tangent loss | | 0.26 | 0.26 | 0.29 | 0.19 | 0.18 | 0.29 | 0.25 | 0.24 | 0.31 |
| Min. storage modulus at 10° C. to 70° C. | Min. | 305 | 316 | 245 | 295 | 781 | 513 | 429 | 312 | 274 |
| R/Ave of basis weight of 2.5 cm square of biaxially stretched sheet | | 0.57 | 0.56 | 0.78 | — | 0.6 | 0.83 | 0.76 | 0.71 | 0.71 |
| Compost treatment | — | A | A | A | A | A | A | A | A | A |
| Moldability (13 mm) | — | A | A | B | B | A | A | A | A | A |
| Moldability (32 mm) | — | A | A | B | B | B | A | B | A | A |
| Molding uniformity | — | 0.4 | 0.43 | 0.56 | 0.72 | 0.48 | 0.39 | 0.49 | 0.41 | 0.44 |

| Properties of Nonwoven Fabric for Molding | Units | Examples | | | | | | | |
|---|---|---|---|---|---|---|---|---|---|
| | | 10 | 11 | 12 | 13 | 14 | 15 | 16 | 17 |
| Basis weight | g/m² | 150 | 150 | 150 | 150 | 150 | 150 | 150 | 150 |
| Fiber diameter | μm | 30 | 34 | 28 | 19 | 26 | 30 | 30 | 30 |
| Birefringence | [—] | 0.015 | 0.016 | 0.015 | 0.031 | 0.016 | 0.008 | 0.017 | 0.017 |
| Rupture elongation at 120° C. | % | 275 | 185 | 240 | 202 | 313 | 154 | 100 | 70 |
| Dimensional change rate at which dimensional change rate in MD direction at 80° C. to 140° C. as determined by thermomechanical analysis becomes maximum | [%] | −0.8 | −1.0 | −0.2 | −0.1 | −1.1 | −1.0 | −1.3 | 2.2 |
| Longitudinal tear strength | N | 6.7 | 1.2 | 7.7 | 11.5 | 6.1 | 6.0 | 0.4 | 54.8 |
| | N/(g/m²) | 0.045 | 0.008 | 0.051 | 0.077 | 0.041 | 0.040 | 0.003 | 0.365 |
| Storage modulus at 90° C. to 150° C. | Max | 71 | 59 | 65 | 66 | 125 | 42 | 234 | 62 |
| | Min | 35 | 32 | 35 | 34 | 39 | 19 | 82 | 37 |
| Max. tangent loss | | 0.28 | 0.31 | 0.28 | 0.27 | 0.17 | 0.42 | 0.13 | 0.25 |
| Min. storage modulus at 10° C. to 70° C. | Min. | 322 | 302 | 322 | 322 | 412 | 214 | 814 | 301 |
| R/Ave of basis weight of 2.5 cm square of biaxially stretched sheet | | 0.52 | 0.63 | 0.69 | 0.91 | 0.57 | 1.23 | 0.98 | — |
| Compost treatment | — | A | A | A | A | A | A | A | A |
| Moldability (13 mm) | — | A | A | A | A | A | A | A | A |
| Moldability (32 mm) | — | A | A | A | A | A | B | B | C |
| Molding uniformity | — | 0.37 | 0.38 | 0.41 | 0.49 | 0.45 | 1.01 | 0.55 | — |

| Properties of Nonwoven Fabric for Molding | Units | Examples | | | | Comparative Examples | |
|---|---|---|---|---|---|---|---|
| | | 18 | 19 | 20 | 21 | 1 | 2 |
| Basis weight | g/m² | 15 | 90 | 150 | 50 | 150 | 150 |
| Fiber diameter | μm | 30 | 30 | 30 | 30 | 30 | 30 |
| Birefringence | [—] | 0.018 | 0.025 | 0.014 | 0.014 | 0.003 | 0.014 |
| Rupture elongation at 120° C. | % | 140 | 172 | 180 | 130 | 224 | 66 |
| Dimensional change rate at which dimensional change rate in MD direction at 80° C. to 140° C. as determined by thermomechanical analysis becomes maximum | [%] | −0.6 | −0.7 | 1.0 | 1.1 | 6.9 | −4.2 |
| Longitudinal tear strength | N | 0.3 | 2.7 | 3.2 | 1.3 | 53.1 | 0.7 |
| | N/(g/m²) | 0.020 | 0.030 | 0.021 | 0.026 | 0.354 | 0.005 |
| Storage modulus at 90° C. to 150° C. | Max | 34 | 77 | 52 | 36 | 21 | 62 |
| | Min | 19 | 38 | 24 | 17 | 15 | 34 |
| Max. tangent loss | | 0.23 | 0.25 | 0.31 | 0.35 | 0.77 | 0.47 |
| Min. storage modulus at 10° C. to 70° C. | Min. | 279 | 429 | 316 | 258 | 13 | 120 |
| R/Ave of basis weight of 2.5 cm square of biaxially stretched sheet | | 0.82 | 1.3 | 1.89 | 2.14 | — | — |
| Compost treatment | — | A | A | A | A | A | A |
| Moldability (13 mm) | — | B | B | B | B | C | C |
| Moldability (32 mm) | — | B | B | B | C | C | C |
| Molding uniformity | — | 0.82 | 1.32 | 0.66 | 0.92 | — | — |

TABLE 1-continued

| Properties of Nonwoven Fabric for Molding | Units | Comparative Examples | | | | | |
|---|---|---|---|---|---|---|---|
| | | 3 | 4 | 5 | 6 | 7 | 8 |
| Basis weight | g/m² | 135 | 17.3 | 100 | 70 | 150 | 70 |
| Fiber diameter | μm | 28 | 15 | 22 | 15 | 25 | 25 |
| Birefringence | [—] | 0.003 | 0.023 | 0.165 | 0.024 | 0.004 | 0.009 |
| Rupture elongation at 120° C. | % | 74 | 25 | 252 | 25 | 192 | 81 |
| Dimensional change rate at which dimensional change rate in MD direction at 80° C. to 140° C. as determined by thermomechanical analysis becomes maximum | [%] | −20.8 | 0.6 | −0.1 | 0.5 | 4.5 | −7.5 |
| Longitudinal tear strength | N | 45.3 | 6.8 | 5.2 | 46.0 | 72.0 | 27.1 |
| | N/(g/m²) | 0.336 | 0.393 | 0.052 | 0.657 | 0.480 | 0.387 |
| Storage modulus at 90° C. to 150° C. | Max | 1 | 639 | 190 | 736 | 82 | 387 |
| | Min | 0.8 | 312 | 14 | 351 | 41 | 102 |
| Max. tangent loss | | 1.5 | 0.12 | 0.39 | 0.13 | 0.66 | 0.71 |
| Min. storage modulus at 10° C. to 70° C. | Min. | 154 | 764 | 319 | 812 | 26 | 147 |
| R/Ave of basis weight of 2.5 cm square of biaxially stretched sheet | | — | — | 0.42 | — | 1.25 | — |
| Compost treatment | — | — | A | A | C | A | A | A |
| Moldability (13 mm) | — | — | C | C | A | C | C | C |
| Moldability (32 mm) | — | — | C | C | A | C | C | C |
| Molding uniformity | — | — | — | — | 0.21 | — | — | — |

The results of measuring dynamic viscosity for Example 10 and Comparative Example 1 are shown in FIG. 3.

The following provides an explanation of the results of evaluations carried out on the properties of the molded body.

Example 22

A biodegradable nonwoven fabric was obtained using the same method as Example 10. The resulting nonwoven fabric was placed in a molding machine and press molded for 2 seconds (including heat-setting time of 0.2 seconds) using a cylindrical mold (diameter: 4.4 cm, height: 3.2 cm) at 80° C. after preheating the woven fabric to 75° C. using hot air followed by using a room temperature mold and cooling to a temperature equal to or lower than the Tg of the polylactic acid to obtain a beverage extraction container (total basis weight: 150 g/m², fiber diameter of stretched portion: 25 μm). A resin film made of polylactic acid was heat-sealed and used for the cover of the container. The results of measuring the maximum value of the dimensional change rate in the MD direction of the beverage extraction container when applying a load of 0.05 N/2 mm to the nonwoven fabric composing the container at 30° C. to 100° C., the change in capacity during immersion in boiling water, the amount of powder, the change in capacity before and after extraction, surface fluff, cover sealability, shape retention during extraction and a biodegradability test are shown in the following Table 2.

Examples 23, 24 and 25

Nonwoven fabric molded bodies were produced in the same manner as Example 22 with the exception of changing the mold temperature during molding to 105° C., 125° C. and 145° C., respectively.

Example 26

A beverage extraction container was obtained by producing a nonwoven fabric molded body in the same manner as Example 23 with the exception of changing the temperature of the nonwoven fabric during molding to 105° C.

Example 27

A beverage extraction container was obtained by producing a nonwoven fabric molded body in the same manner as Example 24 with the exception of changing the temperature of the nonwoven fabric during molding to 125° C.

Example 28

A beverage extraction container was obtained by producing a nonwoven fabric molded body in the same manner as Example 22 with the exception of changing the mold temperature during molding to 90° C. and changing the temperature of the nonwoven fabric to 150° C.

Examples 29 and 30

Beverage extraction containers were obtained by producing nonwoven fabric molded bodies in the same manner as Example 24 with the exception of changing the heat-setting time during molding to 60 seconds and 300 seconds, respectively.

Example 31

A beverage extraction container was obtained by producing a nonwoven fabric molded body in the same manner as Example 23 with the exception of not using a room temperature mold during molding.

Example 32

A beverage extraction container was obtained by producing a nonwoven fabric molded body by using the same polylactic acid long-fiber nonwoven fabric as that used in Example 2 and using the same molding method as that used in Example 26.

Example 33

A beverage extraction container was obtained by producing a nonwoven fabric molded body by using the same polylactic acid long-fiber nonwoven fabric as that used in Example 1 and using the same molding method as that used in Example 26.

Example 34

A beverage extraction container was obtained by producing a nonwoven fabric molded body by using the same polylactic acid long-fiber nonwoven fabric as that used in Example 13 and using the same molding method as that used in Example 24.

Example 35

A beverage extraction container was obtained by producing a nonwoven fabric molded body by using the same polylactic acid long-fiber nonwoven fabric as that used in Example 6 and carrying out thermoforming using the same molding method as that used in Example 24.

Examples 36 and 37

Beverage extraction containers were obtained by producing nonwoven fabric molded bodies by carrying out thermoforming using the same method as Example 22 with the exception of producing a polylactic acid long-fiber nonwoven fabric using the same method as Example 1, changing the mold temperature during molding to 120° C. or 140° C., respectively, and not using a room temperature mold during molding.

Example 38

Polylactic acid fibers obtained by a known melt spinning method at a spinning speed of 1150 m/min and fiber diameter of 30 μm were cut to obtain short fibers having a fiber length of 10 cm. The resulting short fibers were integrated into a single unit by needle punching to obtain a short-fiber nonwoven fabric (basis weight: 150 g/m$^2$) and this used to produce a nonwoven fabric molded body constituting a beverage extraction container in the same manner as Example 23.

Comparative Example 9

A nonwoven fabric molded body constituting a beverage extraction container was produced in the same manner as Example 22 with the exception of changing the mold temperature during molding to 30° C. Breakage occurred during molding that prevented use as a beverage extraction container.

Comparative Example 10

A nonwoven fabric molded body constituting a beverage extraction container was produced by carrying out thermoforming using the same method as Example 24 with the exception of changing the temperature of the nonwoven fabric prior to molding to 40° C. Breakage occurred during molding that prevented use as a beverage extraction container.

Comparative Example 11

A nonwoven fabric molded body constituting a beverage extraction container was produced by producing a nonwoven fabric using the same method as Example 15 and carrying out thermoforming using the same method as Example 22. Oriented crystallization progressed with difficulty and heat stability during extraction was inferior.

Comparative Example 12

A nonwoven fabric molded body constituting a beverage extraction container was produced by producing a nonwoven fabric using the same method as Example 3 and carrying out thermoforming using the same method as Example 26. The basis weight of the stretched portion of the beverage extraction container was low and shape stability during beverage extraction was inferior.

Comparative Example 13

A nonwoven fabric molded body constituting a beverage extraction container was produced in the same manner as Example 26 with the exception of changing the basis weight of the nonwoven fabric used to 500 g/m$^2$.

Comparative Example 14

A nonwoven fabric molded body constituting a beverage extraction container was produced in the same manner as Example 22 with the exception of producing a PET nonwoven fabric using the same method as Comparative Example 5 and changing the mold temperature during molding to 150° C. The resulting beverage extraction container was not biodegradable.

Comparative Example 15

A nonwoven fabric molded body constituting a beverage extraction container was produced by producing a biodegradable nonwoven fabric using the same method as Comparative Example 3 and molding using the same method as Example 22. Shape retention during extraction was poor.

Comparative Example 16

Polylactic acid fibers obtained by a known melt spinning method at a spinning speed of 1500 m/min and fiber diameter of 25 μm were cut to obtain short fibers having a fiber length of 10 cm. The resulting short fibers were integrated into a single unit by needle punching to obtain a short-fiber nonwoven fabric (basis weight: 150 g/m$^2$) and this used to produce a nonwoven fabric molded body constituting a beverage extraction container in the same manner as Example 23. There was considerable fluff on the container surface and product quality was poor.

The results for Examples 22 to 38 and Comparative Examples 9 to 16 are shown in the following Table 2.

TABLE 2

| | | | Examples | | | | | | | | |
|---|---|---|---|---|---|---|---|---|---|---|---|
| | | | 22 | 23 | 24 | 25 | 26 | 27 | 28 | 29 | 30 |
| Molded Body | Max. dimensional change in MD direction at 30° C. to 100° C. (@0.05N/2 mm) | % | 0.1 | 0.6 | 0.5 | 0.6 | 1.0 | 0.8 | 0.3 | 0.3 | 0.2 |
| | Change in capacity after immersing in boiling water | % | 91 | 66 | 63 | 44 | 63 | 59 | 50 | 60 | 50 |
| | Birefringence | — | 0.015 | 0.019 | 0.016 | 0.016 | 0.017 | 0.019 | 0.017 | 0.019 | 0.022 |
| | Degree of crystallinity | % | 48 | 46 | 46 | 45 | 45 | 48 | 38 | 48 | 50 |
| | Nonwoven fabric converted basis weight | g/m² | 150 | 150 | 150 | 150 | 150 | 150 | 150 | 150 | 150 |
| | Fiber diameter | μm | 25 | 21 | 21 | 19 | 21 | 20 | 25 | 21 | 21 |
| | Molded body basis weight | g/m² | 64 | 39 | 40 | 35 | 39 | 50 | 28 | 40 | 40 |
| | Amount of powder | g | 0.32 | 0.18 | 0.17 | 0.18 | 0.16 | 0.15 | 0.24 | 0.17 | 0.17 |
| | Change in capacity after extraction | % | 10 | 3 | 3 | 2 | 2 | 3 | −3 | 2 | 1 |
| | Surface fluff (fibers) | — | 9 | 3 | 3 | 2 | 2 | 1 | 5 | 1 | 0 |
| | Cover sealability (no breakage during extraction: A, breakage: C) | — | A | A | A | A | A | A | A | A | A |
| | Moldability | — | 3 | 4 | 4 | 4 | 4 | 4 | 3 | 4 | 4 |
| | Biodegradability (Yes: A, No: C) | — | A | A | A | A | A | A | A | A | A |

| | | | Examples | | | | | | | |
|---|---|---|---|---|---|---|---|---|---|---|
| | | | 31 | 32 | 33 | 34 | 35 | 36 | 37 | 38 |
| Molded Body | Max. dimensional change in MD direction at 30° C. to 100° C. (@0.05N/2 mm) | % | 0.1 | 3.8 | 0.3 | 1.5 | 1.1 | 2.6 | 3.3 | 0.6 |
| | Change in capacity after immersing in boiling water | % | 5 | 60 | 65 | 45 | 65 | 47 | 6 | 45 |
| | Birefringence | — | 0.015 | 0.020 | 0.017 | 0.020 | 0.011 | 0.018 | 0.026 | 0.009 |
| | Degree of crystallinity | % | 46 | 48 | 45 | 52 | 40 | 37 | 33 | 25 |
| | Nonwoven fabric converted basis weight | g/m² | 150 | 90 | 250 | 150 | 310 | 150 | 150 | 150 |
| | Fiber diameter | μm | 22 | 21 | 19 | 14 | 30 | 19 | 17 | 23 |
| | Molded body basis weight | g/m² | 80 | 23 | 85 | 40 | 135 | 38 | 38 | 53 |
| | Amount of powder | g | 0.10 | 0.50 | 0.10 | 0.12 | 0.19 | 0.18 | 0.15 | 0.17 |
| | Change in capacity after extraction | % | 1 | −11 | −15 | 2 | −5 | −7 | −15 | −5 |
| | Surface fluff (fibers) | — | 3 | 9 | 8 | 4 | 3 | 3 | 0 | 10 or more |
| | Cover sealability (no breakage during extraction: A, breakage: C) | — | A | A | A | A | A | A | A | A |
| | Moldability | — | 2 | 3 | 3 | 3 | 4 | 4 | 4 | 3 |
| | Biodegradability (Yes: A, No: C) | — | A | A | A | A | A | A | A | A |

| | | | Comparative Examples | | | | | | | |
|---|---|---|---|---|---|---|---|---|---|---|
| | | | 9 | 10 | 11 | 12 | 13 | 14 | 15 | 16 |
| Molded Body | Max. dimensional change in MD direction at 30° C. to 100° C. (@0.05N/2 mm) | % | — | — | 5.0 | 4.5 | 6.0 | 1.1 | 4.8 | 3.1 |
| | Change in capacity after immersing in boiling water | % | — | — | 92 | 58 | 82 | 3 | 27 | 10 |
| | Birefringence | — | — | — | 0.009 | 0.019 | 0.016 | 0.077 | 0.020 | 0.023 |
| | Degree of crystallinity | % | — | — | 29 | 50 | 40 | 24 | 28 | 49 |
| | Nonwoven fabric converted basis weight | g/m² | 150 | 150 | 150 | 25 | 500 | 100 | 135 | 150 |
| | Fiber diameter | μm | — | — | 20 | 21 | 25 | 14 | 14 | 23 |
| | Molded body basis weight | g/m² | — | — | 40 | 8 | 125 | 31 | 45 | 53 |
| | Amount of powder | g | — | — | 0.22 | 1.00 | 0.03 | 0.07 | 0.05 | 0.18 |
| | Change in capacity after extraction | % | — | — | x | x | −15 | −11 | −48 | −20 |
| | Surface fluff (fibers) | — | — | — | 10 or more | 10 or more | 10 or more | 0 | 0 | 10 or more |
| | Cover sealability (no breakage during extraction: A, breakage: C) | — | — | A | A | A | A | C | A | A | A |
| | Moldability | — | — | 1 | 1 | 3 | 3 | 3 | 4 | 4 | 3 |
| | Biodegradability (Yes: A, No: C) | — | — | A | A | A | A | A | C | A | A |

INDUSTRIAL APPLICABILITY

The biodegradable nonwoven fabric of the present invention has superior moldability and can be preferably used in a wide range of fields such as containers for domestic living materials or containers for industrial materials, vehicle interior and exterior materials, soundproofing materials, sound absorbing materials, part transport trays, fruit and vegetable trays, food containers, seedling pots or filter applications. In addition, since the biodegradable nonwoven fabric of the present invention has high elongation and can be molded into containers having complex shapes, it can also be preferably used in fields requiring containers having an attractive design.

The invention claimed is:

1. A method for producing the biodegradable nonwoven fabric for thermoforming comprising fibers of a polylactic acid-based polymer, wherein the basis weight of the biodegradable nonwoven fabric is 20 g/m² to 350 g/m², the method comprising a step of performing a constant-length heat setting over the range of 50° C. to 160° C., wherein before the constant-length heat setting, a storage or aging step is carried out at 30° C. to 50° C. for 72 hours to 720 hours.

2. A method for producing the biodegradable nonwoven fabric according to claim 1, comprising the following steps:
   (i) melting a polylactic acid-based polymer by heating and by discharging it from a spinneret to obtain a spun yarn;
   (ii) cooling the spun yarn;
   (iii) accumulating the spun yarn on a conveyor to form a web;
   (iv) carrying out temporary compression bonding on the web to obtain a temporary compression-bonded web; and
   (v) constant-length heat setting the temporary compression-bonded web to a constant length.

3. A method for producing the biodegradable nonwoven fabric according to claim 1, wherein the constant-length heat setting is selected from the group consisting of hot air drying, pin tenter drying, hot plate heating, calendering, felt calendering, and air-through processing.

4. A method for producing the biodegradable nonwoven fabric according to claim 3, wherein the constant-length heat setting is felt calendering processing.

5. A method for producing the biodegradable nonwoven fabric for thermoforming comprising fibers of a polylactic acid-based polymer, wherein the basis weight of the biodegradable nonwoven fabric is 20 g/m² to 350 g/m², the method comprising the following steps: (i) a step of carrying out a spinning process at a spinning speed of 1345-3000 m/min; and (ii) a step for performing constant-length heat setting over the range of 50° C. to 160° C., wherein before the constant-length heat setting, storage or aging step is carried out at 30° C. to 50° C. for 1 hour to 720 hours.

* * * * *